US009914415B2

(12) United States Patent
Buttolo et al.

(10) Patent No.: US 9,914,415 B2
(45) Date of Patent: Mar. 13, 2018

(54) CONNECTIONLESS COMMUNICATION WITH INTERIOR VEHICLE COMPONENTS

(71) Applicant: FORD GLOBAL TECHNOLOGIES, LLC, Dearborn, MI (US)

(72) Inventors: Pietro Buttolo, Dearborn Heights, MI (US); James Stewart Rankin, II, Novi, MI (US); Stephen Ronald Tokish, Sylvania, OH (US); Jeffrey A. Wallace, Walled Lake, MI (US); Stuart C. Salter, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/137,536

(22) Filed: Apr. 25, 2016

(65) Prior Publication Data
US 2017/0305371 A1  Oct. 26, 2017

(51) Int. Cl.
*G06F 3/0484* (2013.01)
*B60R 16/03* (2006.01)
(Continued)

(52) U.S. Cl.
CPC ............ *B60R 16/03* (2013.01); *G06F 3/0481* (2013.01); *G06F 3/0484* (2013.01); *H04W 4/008* (2013.01); *H04W 8/005* (2013.01)

(58) Field of Classification Search
CPC ..... B60R 16/03; G06F 3/0481; G06F 3/0484; H04W 4/008; H04W 8/005
(Continued)

(56) References Cited

U.S. PATENT DOCUMENTS 4,721,954 A   1/1988 Mauch
4,792,783 A   12/1988 Burgess et al.
(Continued)

FOREIGN PATENT DOCUMENTS

CN    102445954 B   3/2014
CN    103942963 A   7/2014
(Continued)

OTHER PUBLICATIONS

Bargshady et al., Precise Tracking of Things via Hybrid 3-D Fingerprint Database and Kernel Method Particle Filter, 2016, IEEE, p. 8963-8971.*
(Continued)

*Primary Examiner* — Mcdieunel Marc
(74) *Attorney, Agent, or Firm* — Jennifer M. Stec; Brooks Kushman P.C.

(57) ABSTRACT

A vehicle component may operate in a plurality of connectionless functional states including a watchdog state in which the component broadcasts advertisements indicating presence of the vehicle component to personal devices; a notify state in which the component broadcasts cycles of advertisements indicating available features of the component; and a process command state in which the component broadcasts current feature state advertisements responsive to command advertisements received from the personal devices. A personal device may operate in a plurality of connectionless functional states including an acquire interface state in which the personal device collects information indicative of component functions based on non-connectable advertisements from in-vehicle components; a display interface state in which the personal device provides a user interface of controls based on information collected during the acquire interface state; and a process command state in
(Continued)

which the device broadcasts command advertisements responsive to operator input to the user interface.

20 Claims, 10 Drawing Sheets

(51) Int. Cl.
  H04W 4/00 (2018.01)
  H04W 8/00 (2009.01)
  G06F 3/0481 (2013.01)
(58) Field of Classification Search
  USPC .................................................. 701/2
  See application file for complete search history.

(56) References Cited

U.S. PATENT DOCUMENTS

| | | | |
|---|---|---|---|
| 4,962,302 A | 10/1990 | Katsumi | |
| 5,132,880 A | 7/1992 | Kawamura | |
| 5,143,437 A | 9/1992 | Matsuno et al. | |
| 5,255,442 A | 10/1993 | Schierbeek et al. | |
| 5,543,591 A | 8/1996 | Gillespie et al. | |
| 5,648,656 A | 7/1997 | Begemann et al. | |
| 5,650,929 A | 7/1997 | Potter et al. | |
| 5,697,844 A | 12/1997 | Von Kohorn | |
| 5,757,268 A | 5/1998 | Toffolo et al. | |
| 5,796,179 A | 8/1998 | Honaga | |
| 5,848,634 A | 12/1998 | Will et al. | |
| 5,850,174 A | 12/1998 | DiCroce et al. | |
| 6,028,537 A | 2/2000 | Suman et al. | |
| 6,377,860 B1 | 4/2002 | Gray et al. | |
| 6,397,249 B1 | 5/2002 | Cromer et al. | |
| 6,449,541 B1 | 9/2002 | Goldberg et al. | |
| 6,473,038 B2 | 10/2002 | Patwari et al. | |
| 6,536,928 B1 | 3/2003 | Hein et al. | |
| 6,935,763 B2 | 8/2005 | Mueller et al. | |
| 7,009,504 B1 | 3/2006 | Banter et al. | |
| 7,015,791 B2 | 3/2006 | Huntzicker | |
| 7,015,896 B2 | 3/2006 | Levy et al. | |
| 7,034,655 B2 | 4/2006 | Magner et al. | |
| 7,342,325 B2 | 3/2008 | Rhodes | |
| 7,502,620 B2 | 3/2009 | Morgan et al. | |
| 7,595,718 B2 | 9/2009 | Chen | |
| 7,672,757 B2 | 3/2010 | Hong et al. | |
| 7,706,740 B2 * | 4/2010 | Collins | H04H 60/65 455/3.01 |
| 7,778,651 B2 | 8/2010 | Billhartz | |
| 7,800,483 B2 | 9/2010 | Bucher | |
| 7,810,969 B2 | 10/2010 | Blackmore et al. | |
| 7,973,773 B2 | 7/2011 | Pryor | |
| 8,065,169 B1 | 11/2011 | Oldham et al. | |
| 8,073,589 B2 | 12/2011 | Rasin et al. | |
| 8,324,910 B2 | 12/2012 | Lamborghini et al. | |
| 8,344,850 B2 | 1/2013 | Girard, III et al. | |
| 8,408,766 B2 | 4/2013 | Wilson et al. | |
| 8,417,258 B2 * | 4/2013 | Barnes, Jr. | G06Q 10/1053 455/414.3 |
| 8,421,589 B2 | 4/2013 | Sultan et al. | |
| 8,447,598 B2 | 5/2013 | Chutorash et al. | |
| 8,476,832 B2 | 7/2013 | Prodin et al. | |
| 8,482,430 B2 | 7/2013 | Szczerba | |
| 8,768,565 B2 | 7/2014 | Jefferies et al. | |
| 8,797,295 B2 | 8/2014 | Bernstein et al. | |
| 8,823,517 B2 | 9/2014 | Hadsall, Sr. | |
| 8,831,514 B2 | 9/2014 | Tysowski | |
| 8,856,543 B2 | 10/2014 | Geiger et al. | |
| 8,866,604 B2 | 10/2014 | Rankin et al. | |
| 8,873,147 B1 | 10/2014 | Rhodes et al. | |
| 8,873,841 B2 | 10/2014 | Yang et al. | |
| 8,880,100 B2 * | 11/2014 | Dobyns | H04W 4/008 455/41.2 |
| 8,930,045 B2 | 1/2015 | Oman et al. | |
| 8,947,202 B2 | 2/2015 | Tucker et al. | |
| 9,053,516 B2 * | 6/2015 | Stempora | G06Q 40/08 |
| 9,078,200 B2 | 7/2015 | Wuergler et al. | |
| 9,104,537 B1 | 8/2015 | Penilla et al. | |
| 9,164,588 B1 | 10/2015 | Johnson et al. | |
| 9,288,270 B1 | 3/2016 | Penilla et al. | |
| 9,350,809 B2 * | 5/2016 | Leppanen | G06Q 50/01 |
| 9,357,054 B1 | 5/2016 | Froment et al. | |
| 9,417,691 B2 * | 8/2016 | Belimpasakis | G06F 3/011 |
| 2002/0069002 A1 | 6/2002 | Morehouse | |
| 2002/0070923 A1 | 6/2002 | Levy et al. | |
| 2002/0087423 A1 | 7/2002 | Carbrey Palango et al. | |
| 2002/0092019 A1 | 7/2002 | Marcus | |
| 2002/0096572 A1 | 7/2002 | Chene et al. | |
| 2002/0178385 A1 | 11/2002 | Dent et al. | |
| 2002/0197976 A1 | 12/2002 | Liu et al. | |
| 2003/0078709 A1 | 4/2003 | Yester et al. | |
| 2003/0171863 A1 | 9/2003 | Plumeier et al. | |
| 2004/0034455 A1 | 2/2004 | Simonds et al. | |
| 2004/0076015 A1 | 4/2004 | Aoki et al. | |
| 2004/0141634 A1 | 7/2004 | Yamamoto et al. | |
| 2004/0215532 A1 | 10/2004 | Boman et al. | |
| 2005/0040933 A1 | 2/2005 | Huntzicker | |
| 2005/0044906 A1 | 3/2005 | Spielman | |
| 2005/0099320 A1 | 5/2005 | Nath et al. | |
| 2005/0136845 A1 | 6/2005 | Masouka et al. | |
| 2005/0185399 A1 | 8/2005 | Beermann et al. | |
| 2005/0261807 A1 | 11/2005 | Sorensen et al. | |
| 2005/0261815 A1 | 11/2005 | Cowelchuk et al. | |
| 2005/0288837 A1 | 12/2005 | Wiegand et al. | |
| 2006/0075934 A1 | 4/2006 | Ram | |
| 2006/0089755 A1 | 4/2006 | Ampunan et al. | |
| 2006/0155429 A1 | 7/2006 | Boone et al. | |
| 2006/0155547 A1 | 7/2006 | Browne et al. | |
| 2006/0205456 A1 | 9/2006 | Bentz et al. | |
| 2006/0250217 A1 | 11/2006 | Hamling et al. | |
| 2006/0258377 A1 | 11/2006 | Economos et al. | |
| 2006/0271261 A1 | 11/2006 | Flores et al. | |
| 2007/0021885 A1 | 1/2007 | Soehren | |
| 2007/0140187 A1 | 6/2007 | Rokusek et al. | |
| 2007/0180503 A1 | 8/2007 | Li et al. | |
| 2007/0198472 A1 | 8/2007 | Simonds et al. | |
| 2007/0201389 A1 | 8/2007 | Murayama | |
| 2007/0262140 A1 | 11/2007 | Long, Sr. | |
| 2008/0140868 A1 | 6/2008 | Kalayjian et al. | |
| 2008/0180231 A1 | 7/2008 | Chen | |
| 2008/0261643 A1 | 10/2008 | Bauer et al. | |
| 2008/0288406 A1 | 11/2008 | Seguin et al. | |
| 2009/0249081 A1 | 10/2009 | Zayas | |
| 2009/0253439 A1 | 10/2009 | Gantner et al. | |
| 2010/0091394 A1 | 4/2010 | DeWind et al. | |
| 2010/0171696 A1 | 7/2010 | Wu | |
| 2010/0176917 A1 | 7/2010 | Bacarella | |
| 2010/0197359 A1 | 8/2010 | Harris | |
| 2010/0216401 A1 | 8/2010 | Kitahara | |
| 2010/0222939 A1 | 9/2010 | Namburu et al. | |
| 2010/0225443 A1 | 9/2010 | Bayram et al. | |
| 2010/0231958 A1 | 9/2010 | Okigami | |
| 2010/0233957 A1 | 9/2010 | Dobosz | |
| 2010/0235045 A1 | 9/2010 | Craig et al. | |
| 2010/0280711 A1 | 11/2010 | Chen et al. | |
| 2010/0315373 A1 | 12/2010 | Steinhauser et al. | |
| 2011/0086668 A1 | 4/2011 | Patel | |
| 2011/0137520 A1 | 6/2011 | Rector et al. | |
| 2011/0187496 A1 | 8/2011 | Denison et al. | |
| 2011/0199298 A1 | 8/2011 | Bassompiere et al. | |
| 2011/0219080 A1 | 9/2011 | McWithey et al. | |
| 2012/0006611 A1 | 1/2012 | Wallace et al. | |
| 2012/0032899 A1 | 2/2012 | Waeller et al. | |
| 2012/0065815 A1 | 3/2012 | Hess | |
| 2012/0096908 A1 | 4/2012 | Fuse | |
| 2012/0098768 A1 | 4/2012 | Bendewald et al. | |
| 2012/0109451 A1 | 5/2012 | Tan | |
| 2012/0136802 A1 | 5/2012 | McQuade et al. | |
| 2012/0154114 A1 | 6/2012 | Kawamura | |
| 2012/0214463 A1 | 8/2012 | Smith et al. | |
| 2012/0214471 A1 | 8/2012 | Tadayon et al. | |
| 2012/0229253 A1 | 9/2012 | Kolar | |
| 2012/0244883 A1 | 9/2012 | Tibbitts et al. | |
| 2012/0254809 A1 | 10/2012 | Yang et al. | |
| 2012/0268235 A1 | 10/2012 | Farhan et al. | |

(56) References Cited

U.S. PATENT DOCUMENTS

| | | |
|---|---|---|
| 2012/0268242 A1 | 10/2012 | Tieman et al. |
| 2013/0015951 A1 | 1/2013 | Kuramochi et al. |
| 2013/0037252 A1 | 2/2013 | Major et al. |
| 2013/0079951 A1 | 3/2013 | Brickman |
| 2013/0099892 A1 | 4/2013 | Tucker et al. |
| 2013/0116012 A1 | 5/2013 | Okayasu |
| 2013/0218371 A1 | 8/2013 | Simard et al. |
| 2013/0227647 A1 | 8/2013 | Thomas et al. |
| 2013/0259232 A1 | 10/2013 | Petel |
| 2013/0261871 A1 | 10/2013 | Hobbs et al. |
| 2013/0283202 A1 | 10/2013 | Zhou et al. |
| 2013/0295908 A1 | 11/2013 | Zeinstra et al. |
| 2013/0300608 A1 | 11/2013 | Margalef et al. |
| 2013/0329111 A1 | 12/2013 | Desai et al. |
| 2013/0335222 A1 | 12/2013 | Comerford et al. |
| 2013/0342379 A1 | 12/2013 | Bauman et al. |
| 2014/0043152 A1 | 2/2014 | Lippman et al. |
| 2014/0068713 A1 | 3/2014 | Nicholson et al. |
| 2014/0121883 A1 | 5/2014 | Shen et al. |
| 2014/0139454 A1 | 5/2014 | Mistry et al. |
| 2014/0142783 A1 | 5/2014 | Grimm et al. |
| 2014/0163774 A1 | 6/2014 | Demeniuk |
| 2014/0164559 A1 | 6/2014 | Demeniuk |
| 2014/0200736 A1 | 7/2014 | Silvester |
| 2014/0212002 A1 | 7/2014 | Curcio et al. |
| 2014/0213287 A1 | 7/2014 | MacDonald et al. |
| 2014/0215120 A1 | 7/2014 | Saylor et al. |
| 2014/0226303 A1 | 8/2014 | Pasdar |
| 2014/0258727 A1 | 9/2014 | Schmit et al. |
| 2014/0277935 A1 | 9/2014 | Daman et al. |
| 2014/0279744 A1 | 9/2014 | Evans |
| 2014/0309806 A1 | 10/2014 | Ricci |
| 2014/0321321 A1 | 10/2014 | Knaappila |
| 2014/0335902 A1 | 11/2014 | Guba et al. |
| 2014/0375477 A1 | 12/2014 | Jain et al. |
| 2014/0379175 A1 | 12/2014 | Mittermeier |
| 2014/0380442 A1 | 12/2014 | Addepalli et al. |
| 2015/0039877 A1 | 2/2015 | Hall et al. |
| 2015/0048927 A1 | 2/2015 | Simmons |
| 2015/0094088 A1 | 4/2015 | Chen |
| 2015/0116085 A1 | 4/2015 | Juzswik |
| 2015/0116100 A1 | 4/2015 | Yang et al. |
| 2015/0123762 A1 | 5/2015 | Park et al. |
| 2015/0126171 A1 | 5/2015 | Miller et al. |
| 2015/0147974 A1 | 5/2015 | Tucker et al. |
| 2015/0148990 A1 | 5/2015 | Patel |
| 2015/0149042 A1 | 5/2015 | Cooper et al. |
| 2015/0154531 A1 | 6/2015 | Skaaksrud |
| 2015/0172902 A1 | 6/2015 | Kasslin |
| 2015/0178034 A1 | 6/2015 | Penilla et al. |
| 2015/0181014 A1 | 6/2015 | Gerhardt et al. |
| 2015/0204965 A1 | 7/2015 | Magarida et al. |
| 2015/0210287 A1 | 7/2015 | Penilla et al. |
| 2015/0223151 A1 | 8/2015 | Lei et al. |
| 2015/0256668 A1 | 9/2015 | Atkinson et al. |
| 2015/0261219 A1 | 9/2015 | Cuddihy et al. |
| 2015/0261573 A1 | 9/2015 | Rausch et al. |
| 2015/0269797 A1 | 9/2015 | Kauffmann et al. |
| 2015/0278164 A1 | 10/2015 | Kim et al. |
| 2015/0283914 A1 | 10/2015 | Malone |
| 2015/0294518 A1 | 10/2015 | Peplin et al. |
| 2015/0332530 A1 | 11/2015 | Kishita |
| 2015/0352953 A1 | 12/2015 | Koravadi |
| 2015/0382160 A1 | 12/2015 | Slay, Jr. et al. |
| 2016/0039430 A1 | 2/2016 | Ricci |
| 2016/0055699 A1 | 2/2016 | Vincenti |
| 2016/0119782 A1 | 4/2016 | Kim |
| 2016/0133072 A1 | 5/2016 | Santavicca |
| 2016/0203661 A1 | 7/2016 | Pudar et al. |
| 2016/0214572 A1 | 7/2016 | Snider |
| 2016/0248905 A1 | 8/2016 | Miller et al. |
| 2016/0332535 A1 | 11/2016 | Bradley et al. |
| 2016/0360382 A1 | 12/2016 | Gross et al. |

FOREIGN PATENT DOCUMENTS

| | | |
|---|---|---|
| JP | 2011131833 A | 7/2011 |
| WO | 2013052043 A1 | 11/2013 |

OTHER PUBLICATIONS

Murugappan et al., Wireless EEG Signals based Neuromarketing System using Fast Fourier Transform (FFT), 2014, IEEE, p. 25-30.*

Katoh et al., A Method of Advertisement Selection in Multiple RFID-Tags Sensor Network for a Ubiquitous Wide-Area Advertising Service, 2008, IEEE, p. 519-524.*

Rasin, "An In/Vehicle Human/Machine Interface Module," XML Journal, Jan. 3, 2003, (9 pages), retrieved from http://xml.sys/con.com/node/40547 on Dec. 13, 2014.

Shahzada, "Touch Interaction for User Authentication," Thesis, Carleton University, Ottawa, Ontario, May 2014 (124 pages).

Napa Sae/Bae et al., "Biometric/Rich Gestures: A Novel Approach to Authentication on Multi/touch Devices," NYU/Poly, CHI 2012, May 5-10, 2012, Austin, TX (10 pages).

Services/Bluetooth Development Portal, last accessed May 30, 2015, https://developer.bluetooth.org/gatt/services/Pages/ServicesHome.aspx. (1 page).

Azad, "The Quick Guide to GUIDs," Better Explained / Math insights that click, last accessed May 24, 2015, http://betterexplained.com/articles (15 pages).

Goodwin, "Add/on module auto/unlocks your car when your phone is near," CNET, Car Tech, Nov. 19, 2013, http://www.cnet.com/news/add/on/module/auto/unlocks/your/car/when/your/phone/is/near (2 pages).

Hertz 24/7, "Book. Unlock. Go. You can reserve your vehicle anywhere, anytime / up to 10 days in advance," last accessed Jul. 28, 2015, https://www.hertz247.com/parkridge/en/us/About (3 pages).

Klosowski, "Unlock Your Car with a Bluetooth Powered Keyless Entry System," Lifehacker, Sep. 30, 2013, http://lifehacker.com/unlock/your/car/with/a/bluetooth/powered/keyless/entry/1427088798 (2 pages).

Toyota, Toyota Prius C Brochure, 2015, available at http://www.toyota.com/priusc/ebrochure.

Thomas, "2010 Toyota Prius Touch Tracer Display," Mar. 3, 2009, available at https://www.cars.com/articles/2009/03/2010/toyota/prius/touch/tracer/display/.

Gahran, "Vehicle owner's manuals // now on smartphones," CNN.com, Jan. 31, 2011, available at http://www.cnn.com/2011/TECH/mobile/01/31/car.manual.phone/.

Specification of the Bluetooth System, Version 4.2, "Master Table of Contents & Compliance Requirements," Dec. 2, 2014, https://www.bluetooth.or/en/us/specification/adopted/specifications. (2,772 pages).

General Motors Corporation; Pontiac GTO Owner's Manual; 2005; pp. 3-19 and 3-20; https://my.gm.com/content/dam/gmownercenter/gmna/dynamic/manuals/2006/pontiac/gto/2006/_gto_owners.pdf.

* cited by examiner

|   |   |   |   |   |   |   |   |   |   |   |   |   |
|---|---|---|---|---|---|---|---|---|---|---|---|---|

200

(A) | XX | XXXX-XXXX | XXXXXXXX | XXXXXXXXXXXXXXXXXXXX | XXXXXXXX | XX | XX | XX |
DD  SMI        VI          FI                        LI        AF BR NC
202 204        206         208                       210       212 214 216

(B) | XX | XXXX-XXXX | XXXXXXXX | XXXXXXXXXXXXXXXXXXXX | XX | XX | XX | XXXXXXXX |
DD  SMI        VI          Label                    ID  CT  ST  Extras
202 204        206         218                      220 222 224 226

(C) | XX | XXXX-XXXX | XXXXXXXX | XXXXXXXXXXXXXXXXXXXX | XX | XX | XXXXXXXXX |
DD  SMI        VI          Label                    ID  Num  (Unused)
202 204        206         218                      220 228  230

(D) | XX | XXXX | XX | NN | MMMM | XXYY | XXYY | XXYY | XXYY | XXYY | XXYY | XXYY | XXYY | XXYY |
DD  ID   PF NV MF   V1   V2   V3   V4   V5   V6   V7   V8   V9
202 220  234 236 238 240  240  240  240  240  240  240  240  240

(E) | XX | XXXX-XXXX | XXXXXXXX | XXXXXXXXXXXXXXXXXXXX | XX | XXYY | XXYY | XXYY |
DD  SMI        VI          FI                        ZF  CT1  CT2  CT3
202 204        206         208                       242 244  244  244

(F) | XX | XX | XXXX-XXXX | XXXXXXXX | XXXXXXXXXXXXXXXXXXXX | XX | XX | XXXXXXXX |
DD  DD  SMI        VI          FI                        ZF  RSSI  (Unused)
202 248 204        206         208                       242 246   230

(G) | XX | XXXX-XXXX | XXXXXXXX | XX | XX-XXXXXXXXXXXX-XX | XXXXXXXXXXXX |
DD  SMI        VI          ZF   MAC                  PIN
202 204        206         XXX  XXX                  XXX

*FIG. 2*

|   | 200 |
|---|---|

(H) | XX | XXXX-XXXX | XXXXXXX | XXXXXXXXXXXXXXXXXXX | XX-XX-XX-XX-XX-XX-XX |
|---|---|---|---|---|
| DD<br>202 | SMI<br>204 | VI<br>206 | FI<br>208 | ID1-IDn<br>232 |

(I) | XX | XXXX-XXXX | XXXXXXX | XXXXXXXXXXXXXXXXXXX | XXXX | XXXXXXXXX |
|---|---|---|---|---|---|
| DD<br>202 | SMI<br>204 | VI<br>206 | Label<br>218 | ID<br>220 | (Unused)<br>230 |

(J) | XX | XXXX-XXXX | XXXXXXX | XX | XXXXXXXXXXXXXXXXXXXXXXXXXXXX |
|---|---|---|---|---|
| DD<br>202 | SMI<br>204 | VI<br>206 | ZF<br>220 | (Unused)<br>230 |

(K) | XX | XXXX-XXXX | XXXXXXX | XX | XX | XXXXXXXXXXXXXXXXXXXXXXXXXX |
|---|---|---|---|---|---|
| DD<br>202 | SMI<br>204 | VI<br>206 | ZF<br>220 | AC<br>XXX | (Unused)<br>230 |

CONNECTIONLESS COMMUNICATION WITH INTERIOR VEHICLE COMPONENTS

TECHNICAL FIELD

Aspects of the disclosure generally relate to connectionless communication with in-vehicle components.

BACKGROUND

BLUETOOTH technology may be included in various user devices to allow the devices to communicate with one another. BLUETOOTH low energy (BLE) is another wireless technology designed to provide for communication of data between devices. As compared to BLUETOOTH, BLE offers communication of smaller amounts of data and with reduced power consumption.

BLE devices may perform the roles of central device or peripheral device. Central devices wirelessly scan for advertisements by peripheral devices, while peripheral devices make the advertisements. Once the peripheral device connects to the central device, the peripheral device may discontinue the advertisement, such that other central devices may no longer be able to wirelessly identify it or connect to it until the existing connection is broken.

BLE devices transfer data using concepts referred to as services and characteristics. Services are collections of characteristics. A central device may connect to and access one or more of the characteristics of a service of a peripheral device. Characteristics encapsulate a single value or data type having one or more bytes of data as well as zero or more descriptors that describe the value of the characteristic. The descriptors may include information such as human-readable descriptions, range for the value of the characteristic, or a unit of measure of the value of the characteristics. A Service Discovery Protocol (SDP) may allow a device to discover services offered by other devices and their associated parameters. The services may be identified by universally unique identifiers (UUIDs).

SUMMARY

In an illustrative embodiment, a system includes a wireless transceiver; and a processor, in communication with the transceiver, programmed to filter non-connectable advertisements to exclude advertisements lacking a predefined identifier unique to in-vehicle components, generate a user interface of controls based on information collected from the filtered advertisements; and broadcast a command advertisement to the in-vehicle components responsive to operator input adjusting a component function using one of the controls.

In another illustrative embodiment, a system includes a vehicle component configured to operate in a plurality of connectionless functional states including a watchdog state in which the component broadcasts advertisements indicating presence of the vehicle component to personal devices; a notify state in which the component broadcasts cycles of advertisements indicating available features of the component; and a process command state in which the component broadcasts current feature state advertisements responsive to command advertisements received from the personal devices.

In yet another illustrative embodiment, a system includes a personal device configured to operate in a plurality of connectionless functional states including an acquire interface state in which the personal device collects information indicative of component functions based on non-connectable advertisements from in-vehicle components; a display interface state in which the personal device provides a user interface of controls based on information collected during the acquire interface state; and a process command state in which the personal device broadcasts command advertisements responsive to operator input to the user interface.

BRIEF DESCRIPTION OF THE DRAWINGS

FIG. 2 illustrates example formats for advertisement packets provided between in-vehicle components and personal devices;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicle interior modules, such as reading lights or speakers, may be enhanced with a wireless communication interface such as BLE. These enhanced modules of the vehicle interior may be referred to as in-vehicle components. Vehicle occupants may utilize their smartphones or other personal devices to wirelessly control features of the in-vehicle components using the communication interface. In an example, a vehicle occupant may utilize an application installed to the personal device to turn a reading light on or off, or to adjust a volume of a speaker.

The personal device may acquire a list of available in-vehicle components by scanning for BLE advertisement packets from the in-vehicle components. The personal device may then connect to the in-vehicle component with which the personal device wishes to interact. However, once a BLE connection is formed, the in-vehicle component discontinues BLE advertisement until disconnection. This means that if one of the vehicle occupants is interacting with one of the interior modules, that module will be not be "visible" to other occupants, and also will be unavailable for triangulating the position of personal devices. As another disadvantage, dynamic changes to the UUID may require a reboot of the BLE component.

An improved in-vehicle component system may utilize non-connectable advertisement to provide for two-way communication of personal devices to in-vehicle components. The non-connectable advertisements may include broadcasting payload information for a Generic Access Profile (GAP). As compared to advertisements that include information about available services, non-connectable advertisements may instead be used to broadcast a desired GAP payload indicative of the current state of the component. As discussed in further detail herein, these payload may be used be used to implement a non-connectable advertisement communication protocol between in-vehicle components and personal devices.

Figure 1A:
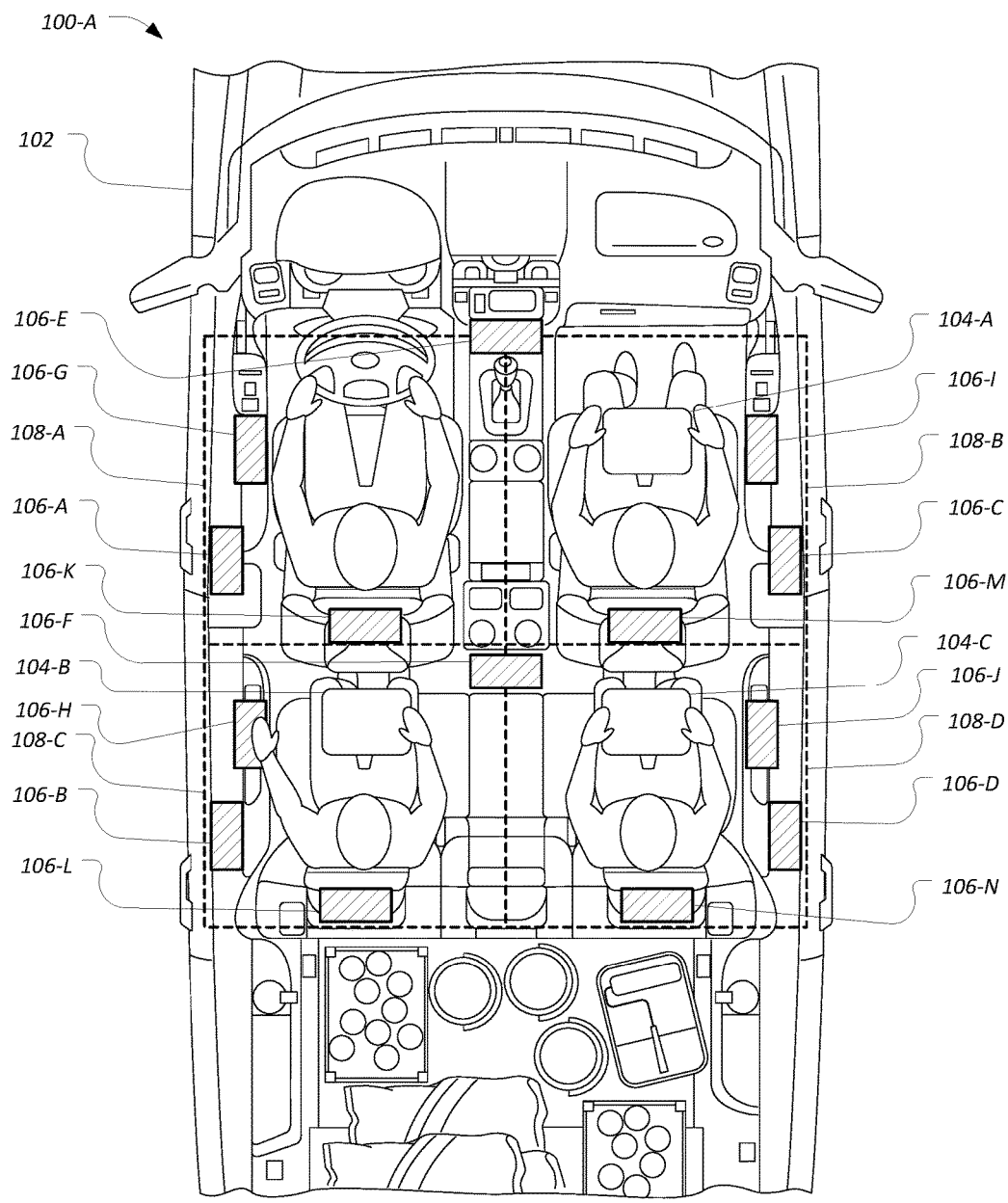
FIG. 1A illustrates an example system including a vehicle having a mesh of in-vehicle components configured to locate and interact with vehicle occupants and user devices.

FIG. 1A illustrates an example system 100 including a vehicle 102 having a mesh of in-vehicle components 106 configured to locate and interact with users and personal devices 104 of the users. The system 100 may be configured to allow the users, such as vehicle occupants, to seamlessly interact with the in-vehicle components 106 in the vehicle 102 or with any other framework-enabled vehicle 102. Moreover, the interaction may be performed without requiring the personal devices 104 to have been paired with or be in communication with a head unit or other centralized computing platform of the vehicle 102.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The personal devices 104-A, 104-B and 104-C (collectively 104) may include mobile devices of the users, and/or wearable devices of the users. The mobile devices may be any of various types of portable computing device, such as cellular phones, tablet computers, smart watches, laptop computers, portable music players, or other devices capable of networked communication with other mobile devices. The wearable devices may include, as some non-limiting examples, smartwatches, smart glasses, fitness bands, control rings, or other personal mobility or accessory device designed to be worn and to communicate with the user's mobile device.

The in-vehicle components 106-A through 106-N (collectively 106) may include various elements of the vehicle 102 having user-configurable settings. These in-vehicle components 106 may include, as some examples, overhead light in-vehicle components 106-A through 106-D, climate control in-vehicle components 106-E and 106-F, seat control in-vehicle components 106-G through 106-J, and speaker in-vehicle components 106-K through 106-N. Other examples of in-vehicle components 106 are possible as well, such as rear seat entertainment screens or automated window shades. In many cases, the in-vehicle component 106 may expose controls such as buttons, sliders, and touchscreens that may be used by the user to configure the particular settings of the in-vehicle component 106. As some possibilities, the controls of the in-vehicle component 106 may allow the user to set a lighting level of a light control, set a temperature of a climate control, set a volume and source of audio for a speaker, and set a position of a seat.

The vehicle 102 interior may be divided into multiple zones 108, where each zone 108 may be associated with a seating position within the vehicle 102 interior. For instance, the front row of the illustrated vehicle 102 may include a first zone 108-A associated with the driver seating position, and a second zone 108-B associated with a front passenger seating position. The second row of the illustrated vehicle 102 may include a third zone 108-C associated with a driver-side rear seating position and a fourth zone 108-D associated with a passenger-side rear seating position. Variations on the number and arrangement of zones 108 are possible. For instance, an alternate second row may include an additional fifth zone 108 of a second-row middle seating position (not shown). Four occupants are illustrated as being inside the example vehicle 102, three of whom are using personal devices 104. A driver occupant in the zone 108-A is not using a personal device 104. A front passenger occupant in the zone 108-B is using the personal device 104-A. A rear driver-side passenger occupant in the zone 108-C is using the personal device 104-B. A rear passenger-side passenger occupant in the zone 108-D is using the personal device 104-C.

Each of the various in-vehicle components 106 present in the vehicle 102 interior may be associated with the one or more of the zones 108. As some examples, the in-vehicle components 106 may be associated with the zone 108 in which the respective in-vehicle component 106 is located and/or the one (or more) of the zones 108 that is controlled by the respective in-vehicle component 106. For instance, the light in-vehicle component 106-C accessible by the front passenger may be associated with the second zone 108-B, while the light in-vehicle component 106-D accessible by a rear passenger-side occupant may be associated with the fourth zone 108-D. It should be noted that the illustrated portion of the vehicle 102 in FIG. 1A is merely an example, and more, fewer, and/or differently located in-vehicle components 106 and zones 108 may be used.

Figure 1B:
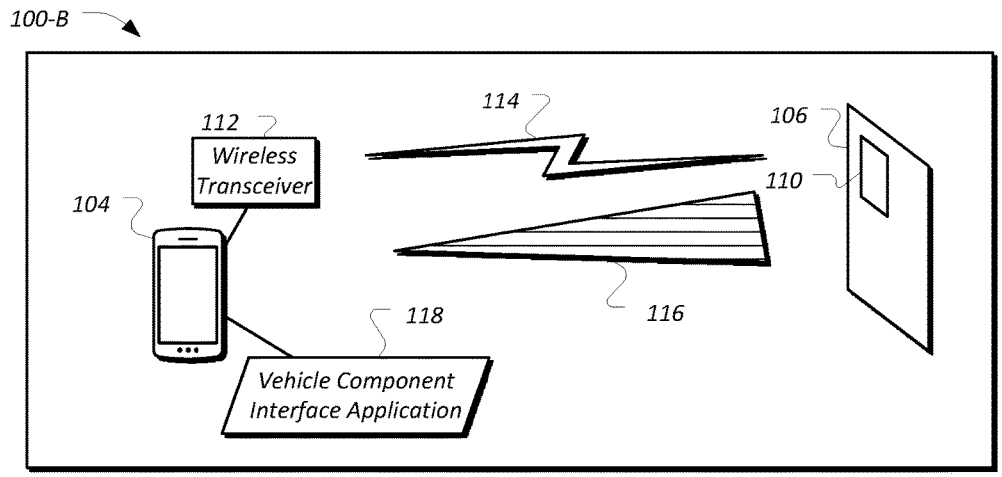
FIG. 1B illustrates an example in-vehicle component equipped with a wireless transceiver configured to facilitate detection of and identify proximity of the personal devices.

Referring to FIG. 1B, each in-vehicle component 106 may be equipped with a wireless transceiver 110 configured to facilitate detection of and identify proximity of the personal devices 104. In an example, the wireless transceiver 110 may include a wireless device, such as a BLUETOOTH Low Energy transceiver configured to enable low energy BLUETOOTH signal intensity as a locator, to determine the proximity of the personal devices 104. Detection of proximity of the personal device 104 by the wireless transceiver 110 may, in an example, cause a vehicle component interface application 118 of the detected personal device 104 to be activated.

In many examples the personal devices 104 may include a wireless transceiver 112 (e.g., a BLUETOOTH module, a ZIGBEE transceiver, a Wi-Fi transceiver, an IrDA transceiver, an RFID transceiver, etc.) configured to communicate with other compatible devices. In an example, the wireless transceiver 112 of the personal device 104 may communicate data with the wireless transceiver 110 of the in-vehicle component 106 over a wireless connection 114. In another example, a wireless transceiver 112 of a wearable personal device 104 may communicate data with a wireless transceiver 112 of a mobile personal device 104 over a wireless connection 114. The wireless connections 114 may be a BLUETOOTH Low Energy (BLE) connection, but other types of local wireless connection 114, such as Wi-Fi or Zigbee may be utilized as well.

The personal devices 104 may also include a device modem configured to facilitate communication of the personal devices 104 with other devices over a communications network. The communications network may provide communications services, such as packet-switched network services (e.g., Internet access, VoIP communication services), to devices connected to the communications network. An example of a communications network may include a cellular telephone network. To facilitate the communications over the communications network, personal devices 104 may be associated with unique device identifiers (e.g., mobile device numbers (MDNs), Internet protocol (IP) addresses, identifiers of the device modems, etc.) to identify the communications of the personal devices 104 over the communications network. These personal device 104 identifiers may also be utilized by the in-vehicle component 106 to identify the personal devices 104.

The vehicle component interface application 118 may be an application installed to the personal device 104. The vehicle component interface application 118 may be configured to facilitate vehicle occupant access to features of the in-vehicle components 106 exposed for networked configuration via the wireless transceiver 110. In some cases, the vehicle component interface application 118 may be configured to identify the available in-vehicle components 106, identify the available features and current settings of the identified in-vehicle components 106, and determine which of the available in-vehicle components 106 are within proximity to the vehicle occupant (e.g., in the same zone 108 as the location of the personal device 104). The vehicle component interface application 118 may be further configured to display a user interface descriptive of the available features, receive user input, and provide commands based on the user input to allow the user to control the features of the in-vehicle components 106. Thus, the system 100 may be configured to allow vehicle occupants to seamlessly interact with the in-vehicle components 106 in the vehicle 102, without requiring the personal devices 104 to have been paired with or be in communication with a head unit of the vehicle 102.

Each in-vehicle component 106 may also be equipped with a notification device 120 configured to facilitate identification of the physical location of the in-vehicle component 106 within the vehicle 102 by the occupants of the vehicle 102. In an example, the notification device 120 may be a backlight of the in-vehicle component 106. In another example, the notification device 120 may utilize other features of the controls of the set of controls of the in-vehicle component 106 to perform the notification, such as existing lighting elements of the in-vehicle component 106. In yet a further example, the notification device 120 may utilize audio chimes or other sounds emanating from the in-vehicle component 106 to aid in the location of the in-vehicle component 106. In an even further example, the notification device 120 may utilize haptic feedback devices or tactile feedback devices to provide a physical indication to a user (e.g., to a user's hand) of the particular location of the in-vehicle component 106. It should also be noted that these approaches may be combined, and the notification device(s) 120 may perform more than one of the aforementioned or other notifications.

The system 100 may use one or more device location-tracking techniques to identify the zone 108 in which the personal device 104 is located. Location-tracking techniques may be classified depending on whether the estimate is based on proximity, angulation, or lateration. Proximity methods are "coarse-grained," and may provide information regarding whether a target is within a predefined range but they do not provide an exact location of the target. Angulation methods estimate a position of the target according to angles between the target and reference locations. Lateration provide an estimate of the target location, starting from available distances between target and references. The distance of the target from a reference can be obtained from a measurement of signal strength 116 over the wireless connection 114 between the wireless transceiver 110 of the in-vehicle component 106 and the wireless transceiver 112 of the personal device 104, or from a time measurement of either arrival (TOA) or difference of arrival (TDOA).

One of the advantages of lateration using signal strength 116 is that it can leverage the already-existing received signal strength indication (RSSI) signal strength 116 information available in many communication protocols. For example, iBeacon uses the RSSI signal strength 116 information available in the BLUETOOTH Low-Energy (BLE) protocol to infer the distance of a beacon from a personal device 104 (i.e. a target), so that specific events can be triggered as the personal device 104 approaches the beacon. Other implementations expand on the concept, leveraging multiple references to estimate the location of the target. When the distance from three reference beacons are known, the location can be estimated in full (trilateration) from the following equations:

$$d_1^2 = (x-x_1)^2 + (y-y_1)^2 + (z-z_1)^2$$

$$d_2^2 = (x-x_2)^2 + (y-y_2)^2 + (z-z_2)^2$$

$$d_3^2 = (x-x_3)^2 + (y-y_3)^2 + (z-z_3)^2 \quad (1)$$

Figure 1C:
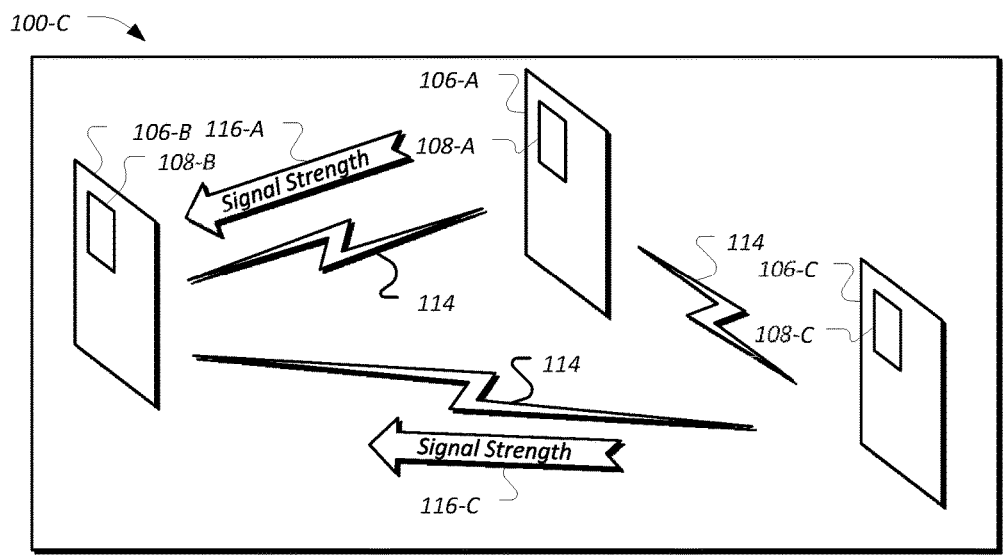
FIG. 1C illustrates an example in-vehicle component requesting signal strength from other in-vehicle components of the vehicle.

In an example, as shown in FIG. 1C, an in-vehicle component 106-B may broadcast or otherwise send a request for signal strength 116 to other in-vehicle components 106-A and 106-C of the vehicle 102. This request may cause the other in-vehicle components 106-A and 106-C to return wireless signal strength 116 data identified by their respective wireless transceiver 110 for whatever devices they detect (e.g., signal strength 116-A for the personal device 104 identified by the wireless transceiver 110-A, signal strength 116-C for the personal device 104 identified by the wireless transceiver 110-C). Using these signal strengths 116-A and 116-C, as well as signal strength 116-B determined by the in-vehicle component 106-B using its wireless transceiver 110-B, the in-vehicle component 106-B may use the equations (1) to perform trilateration and locate the personal device 104. As another possibility, the in-vehicle component 106 may identify the personal device 104 with the highest signal strength 116 at the in-vehicle component 106 as being the personal device 104 within the zone 108 as follows:

$$\text{Personal Device} = i \implies \max_{i=1,n} RSSI_i \quad (5)$$

Thus, the mesh of in-vehicle components 106 and the personal devices 104 may accordingly be utilized to allow the in-vehicle components 106 to identify in which zone 108 each personal device 104 is located.

As yet another possibility for locating of the personal device 104 within the vehicle 102, signal strengths 116 of the personal device 104 to each of the in-vehicle components 106 of a particular zone 108 may be used to determine whether the personal device 104 is located within that zone 108. As yet a further possibility for locating of the personal device 104 within the vehicle 102, symmetrical sets of in-vehicle components 106 with a symmetrical vehicle 102 cabin may be utilized to estimate the location of the personal device 104.

Regardless of the particular approach that is used, the mesh of in-vehicle components 106 and the personal devices 104 may be utilized to allow the in-vehicle components 106 to identify in which zone 108 each personal device 104 is located. As each of the in-vehicle components 106 is also associated with a zone 108, the in-vehicle components 106 may accordingly identify the personal device 104 to be notified as being the personal device 104 that is associated with the same zone 108 with which the in-vehicle component 106 is associated.

As one possibility, the in-vehicle component 106 may utilize signal strength 116 data received from the personal devices 104 in the vehicle 102 to identify which of the personal devices 104 is in use by the occupant physically interacting with the seating controls in-vehicle component 106-H. For instance, identifying the personal device 104 with the highest signal strength 116 at the in-vehicle component 106 would likely identify the correct personal device 104, e.g., as follows:

$$\text{Personal Device} = i \implies \max_{i=1,n} RSSI_i \qquad (5)$$

FIG. 2 illustrates example formats for advertisement packets 200 provided between in-vehicle components 108 and personal devices 104. The advertisement packets 200 may be advertised by the in-vehicle components 108 and personal devices 104 as GAP packets. A GAP packet includes 31-bytes. However, once packet header, data length, and type information elements are accounted for, only 26 are available for user-defined data. Accordingly, the example advertisement packets 200 formats (A) through (K) are each shown as including up to 26-bytes, where each of the advertising packets 200 formats (A) through (K) may be used for various specific purposes as described in detail herein.

Each of the example advertisement packets 200 may include a data descriptor (DD) field 202 defining the type of the advertisement packet 200 to allow a recipient to understand the data being broadcast. Certain types of the advertisement packet 200 may be advertised by in-vehicle components 106, while other types of advertisement packets 200 may be advertised by personal devices 104.

For in-vehicle components 106, a first DD field 202 value of zero may indicate an advertisement packet 200 in the format (A) for a watchdog module pinging for personal devices 104, a DD field 202 value of one may indicate an advertisement packet 200 in the format (A) for a watchdog module requesting other modules to wake up, and a DD field 202 value of two may indicate an advertisement packet 200 in the format (A) for a component notifying its presence and/or location to the mesh. ADD field 202 value of three may indicate an advertisement packet 200 in the format (B) for a component communicating an interface template for its functional controls. A DD field 202 value of four may indicate an advertisement packet 200 in the format (C) for a component communicating a list interface element. A DD field 202 value of seven may indicate an advertising packet 200 in the format (D) for a component communicating an enhanced interface. A DD field 202 value of nine may indicate an advertising packet 200 in the format (E) for a component communicating current values of functional parameters. A DD field 202 value of ten may indicate an advertising packet 200 in the format (F) for a relay component forwarding a request to another module. A DD field 202 value of eleven may indicate an advertising packet 200 in the format (E) for a component communicating an occupant interaction. A DD field 202 value of twelve may indicate an advertising packet 200 in the format (G) for a component communicating BLUETOOTH and/or wireless device connection information.

For personal devices 104, a DD field 202 value of five may indicate an advertisement packet 200 in the format (H) requesting an interface template for specified controls of an in-vehicle component 106. A DD field 202 value of six may indicate an advertisement packet 200 in the format (I) requesting an enhanced interface template of an in-vehicle component 106. A DD field value of eight may indicate an advertisement packet 200 in the format (E) requesting to set a feature of an in-vehicle component 106 function. A DD field 202 value of thirteen may indicate an advertisement packet 200 in the format (J) requesting BLUETOOTH and/or wireless device connection information. A DD field 202 value of fourteen may indicate an advertisement packet 200 in the format (K) requesting in-vehicle components 106 of a specified seating zone 108 to change settings.

Using the advertising packets 200, payloads from the in-vehicle components 106 to the personal devices 104, and from the personal devices 104 to the in-vehicle components 106, may be used to implement the non-connectable advertisement communication protocol.

As shown with regard to the example packet (A), the advertisement packet 200 may include the data descriptor (DD) field 202 as a two-byte field, followed by an eight-byte smart module identifier (SMI) field 204, followed by an eight-byte vehicle identifier (VI) field 206, followed by a twenty-byte function identifier (FI) field 208, followed by a six-byte location identifier (LI) field 210, followed by a one-byte attributes flag (AF) field 212, followed by a one-byte base RSSI (BR) field 214, followed by a one-byte number-of-individual-controls (NC) field 216. It should be noted, however, that different lengths, types, orders, constant values, and data elements of advertisement packets 200 may additionally or alternately be used.

The DD field 202 may be used to indicate the state the broadcasting in-vehicle component 108 is currently in. In an example, a first value (e.g., zero) may be used to represent that the in-vehicle component 108 is in a "watchdog" state, a second value (e.g., one) may be used to represent that the in-vehicle component 108 is in a "low-power" state, and a third value (e.g., two) may be used to represent that the in-vehicle component 108 is in a "notify/triangulate" state. Further aspects of in-vehicle component 108 states are discussed in further detail below with respect to FIG. 3.

The SMI field 204 may be used to provide an identifier unique to in-vehicle components 108. This may be done to allow other devices to filter out broadcast data that is not broadcast by an in-vehicle component 108. In an example, the SMI field 204 may include the four byte constant "F03DD30F" in HEX format. It should be noted that other constants or identifiers could be used, including shorter or longer identifiers.

The VI field 206 may be used to provide a vehicle-specific identifier. This may allow for in-vehicle components 108 to be identified as belonging to a specific vehicle 102. This information can be programmed by smartphone in newly-installed modules. Not all modules will have information. Some carry-on items, such as a smart baby-seat or smart cooler may be identified as part of the vehicle 102 by triangulation. While shorter or longer identifiers may be used, in the example of a VI field 206 of four bytes, there may be more than four billion combinations. Accordingly, the chances of two vehicles 102 having the same identifiers and being within communication range of one another is negligible.

The FI field 208 may be used to describe a main function or category of function supported by the in-vehicle component 108. In an example, the FI field 208 may indicate a first value for a light, a second value for a seat, a third value for a climate control, and so on.

The LI field 210 may be used to describe the placement of the in-vehicle component 108 within the vehicle 102. For instance, the LI field 210 may specify X, Y, and Z coordinates of the in-vehicle component 108 inside the vehicle 102, each as one byte, and the seating zone 106 as one byte. In many examples, the X, Y and Z location information may be normalized such that the dimension from the left side to the right side of the vehicle is exactly one hundred units. As some other possible data conventions, fore-aft location at the steering wheel may be assigned to be zero, and vertically the ground of the vehicle 102 may be set to zero. Regarding the seating zone 106 byte, each bit in the byte may correspond to an applicable seating zone 106, such that if the in-vehicle component 108 is accessible from that zone, the corresponding bit may be set. As one possibility, if the in-vehicle component 108 is accessible from the driver seating zone 106 the first byte may be set, if the in-vehicle component 108 is accessible from the front passenger seating zone 106 the second bit may be set, if the in-vehicle component 108 is accessible from the second row driver side seating zone 106 the third bit may be set, and if the in-vehicle component 108 is accessible from the second row passenger side seating zone 106 the fourth bit may be set. If the in-vehicle component 108 is accessible from all the seating zones 108, then all of the bits of the byte may be set.

The AF field 212 may be used to indicate attributes descriptive of which predefined behaviors are implemented by the in-vehicle component 108. These attributes may indicate, in an example, one or more of a Watchdog behavior (e.g., specified by setting a first bit of the AF field 212), a Triangulation-Node behavior (e.g., specified by setting a second bit of the AF field 212), a Functional-Node behavior (e.g., specified by setting a third bit of the AF field 212), an Occupant-Interaction-Node behavior (e.g., specified by setting a fourth bit of the AF field 212), a Relay-Node behavior (e.g., specified by setting a fifth bit of the AF field 212), a Service-Node behavior (e.g., specified by setting a sixth bit of the AF field 212), and a Connectivity-Helper behavior (e.g., specified by setting a seventh bit of the AF field 212). An in-vehicle component 108 can possess any combination of one or more of these or other attributes.

The Watchdog attribute may be set to indicate that the in-vehicle component 108 transitions to a "sleep" mode rather than to a "dormant" mode when the vehicle 102 is off. When in "sleep" mode, the in-vehicle component 108 may increase an advertisement interval to advertise at a lower cadence (e.g., once every 2 seconds instead of at a shorter interval). In contrast, when an in-vehicle component 108 is in the "dormant" mode, the in-vehicle component 108 may discontinue advertisements. More generally, in the "dormant" mode the in-vehicle component 108 may reduce power consumption of the in-vehicle component 108 to a minimal or zero consumption level.

The Triangulation-Node attribute may be set to indicate that the in-vehicle component 108 supports providing signal strength information 116 to allow for location of personal devices 104 within the vehicle 102. An in-vehicle component 108 having the Triangulation-Node attribute set may go into a "dormant" state, but may be activated by a watchdog if a personal device 104 is to be located inside or outside the vehicle 102 (e.g., for authentication).

The Functional-Node attribute may be set to indicate that the in-vehicle component 108 directly controls the function of an interior component (e.g., a light, a seat, etc.). An in-vehicle component 108 having the Functional-Node attribute set may be configured to maintain and/or provide template information descriptive of the controllable functionality of the in-vehicle component 108. In an example, the in-vehicle component 108 may transmit the template information to a requesting personal device 104.

The Occupant-Interaction-Node attribute may be set to indicate that the in-vehicle component 108 can trigger an enhanced interface to "pop up" on a personal device 104 located in the same seating zone 106 when in-vehicle component 108 detects interaction with the in-vehicle component 108 by the user.

The Relay-Node attribute may be set to indicate that the in-vehicle component 108 can request activation of functions of another in-vehicle component 108. As an example, the in-vehicle component 108 may be mounted on a door panel, and may operate as a switch to turn on heating on the seat within the same seating zone 106, without any physical wired connection between the switch and the seat.

The Service-Node attribute may be set to indicate that the in-vehicle component 108 provides "sensor" data, or other content, to other in-vehicle components 108 and personal devices 104 to use. As an example, the in-vehicle component 108 may be a magnetometer pointing to the direction of the longitudinal axis of the vehicle 102 and used by a personal device 104 to implement gesture control.

The Connectivity-Helper-Node attribute may be set to indicate that the in-vehicle component 108 that contains pairing information that may be used by personal devices 104 to connect to classic BLUETOOTH, Wi-Fi, and other accessories located in the seating zone 106. This in-vehicle component 108 may be used, for example, to automatically pair a user's personal device 104 to the correct speaker and correct monitor inside a vehicle 102 with individual "theater" components.

The BR field 214 may indicate a relative level of RSSI data provided by the in-vehicle component 108. This value may be used to adjust or normalize signal level across in-vehicle components 108 depending on where the in-vehicle component 108 is installed and BLE characteristics of the BLE transceiver 110 of the in-vehicle component 108.

The NC field 216 may be used to indicate how many individual controls are available in the user interface of the in-vehicle component 108. If the in-vehicle component 108 does not provide any direct functionality, then NC field 216 may be set to zero.

Figure 3:
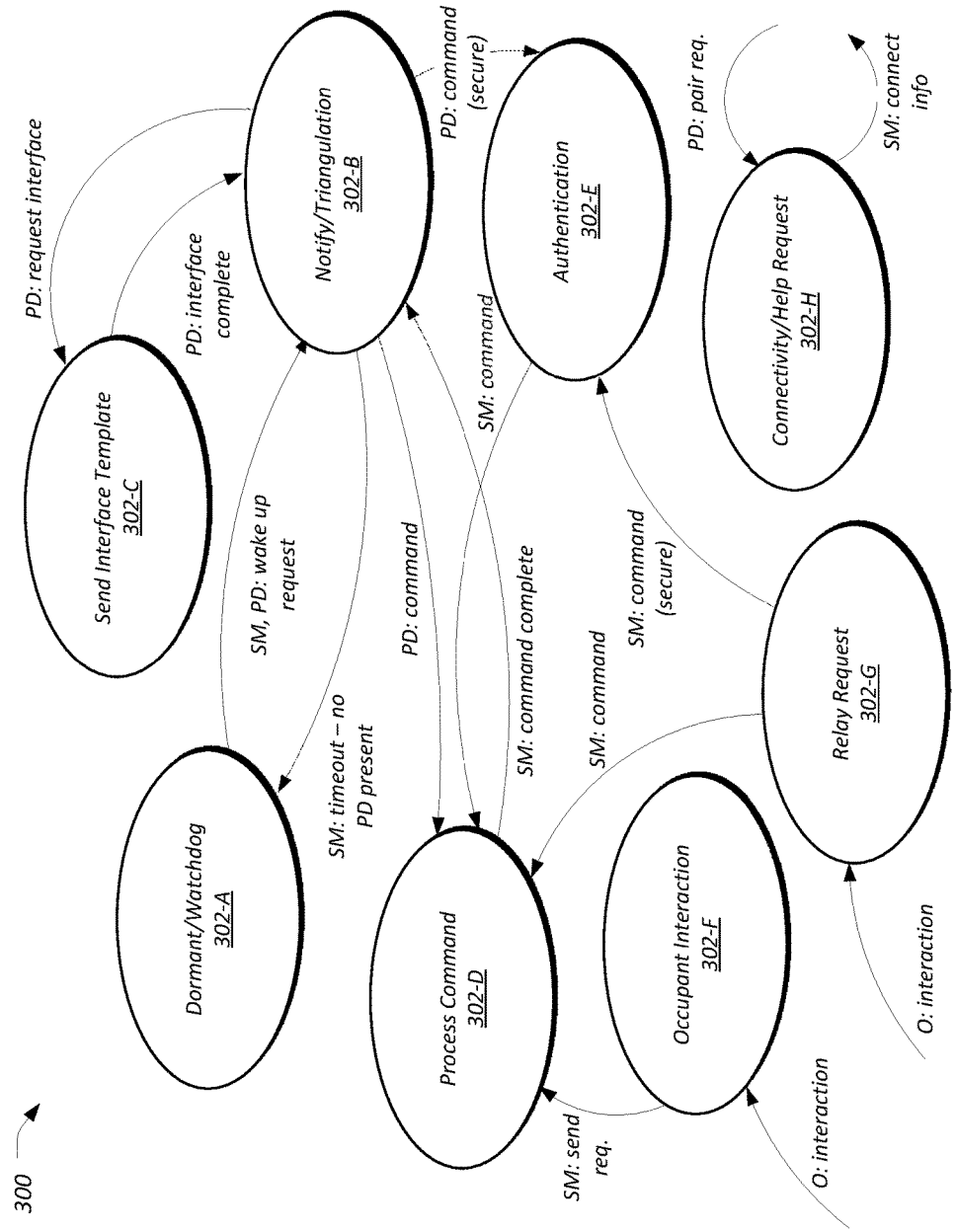
FIG. 3 illustrates an example description of a state machine for use by an in-vehicle component.

FIG. 3 illustrates an example description of a state machine 300 for use by an in-vehicle component 108. The state machine 300 includes a plurality of states 302 in which the in-vehicle component 108 may be set. As shown in the state machine 300, events or actions causing a transition across states 302 are preceded by a short label indicating whether the transition is initiated by the personal device 104 (PD), the in-vehicle component 108 (SM), or by physical action of a vehicle 102 occupant (O). The illustrated possible states (collectively 302) may include a "dormant/watchdog" state 302-A, a "notify-triangulation" state 302-B, a "send interface template" state 302-C, a "process command" state 302-D, an "authentication" state 302-E, an "occupant interaction" state 302-F, a "relay request" state 302-G, and a "connectivity help request" state 302-H. It should be noted that the illustrated states 302 are merely an example, and more, fewer, and/or different states 302 may be used.

Depending on the functional attributes of the in-vehicle component 108 (e.g., as specified in the AF field 212), the in-vehicle component 108 will have different "abilities" and possess or require different information to share with and/or request from the mesh of in-vehicle components 108. Thus, certain states 302 of the state machine 300 will be accessed only by in-vehicle component 108 possessing certain associated attributes. Additionally, what information is shared with or requested from the mesh of in-vehicle components 108 also depends on in which state 302 the in-vehicle component 108 is presently set.

Many in-vehicle components 108 are control units for an interior function of the vehicle 102, such as lights or seats. Such in-vehicle components 108 may be set with the functional attributes of functional-node and triangulation-node. These attributes may be considered to be primary attributes for control units for interior functions. A functional node is, by default, in either the "dormant/watchdog" state 302-A or in the "notify/triangulation" state 302-B.

The "dormant/watchdog" state 302-A may be triggered by events such as turning off the vehicle 102 engine, absence of detection of personal devices 104 for longer than a pre-defined time interval, or by an explicit request from a body controller or other master vehicle controller. How deep of a dormant sleep the in-vehicle components 108 goes into while in the "dormant/watchdog" state 302-A depends on whether the in-vehicle component 108 is a "watchdog" in-vehicle component 108 or not. A "watchdog" in-vehicle component 108 may be responsible for continuing to broadcast the presence of the mesh of in-vehicle components 108 despite the vehicle 102 being off, albeit at a reduced rate to reduce power consumption.

The advertised packet 200 during the "dormant/watchdog" state 302-A allows a listening personal device 104 to perform various tasks. As an example, the advertised packet 200 allows the personal device 104 to identify the in-vehicle component 108 as part of the "Smart-Module" framework (e.g., using the SMI field 204). As another example, the advertised packet 200 allows the personal device 104 to identify the in-vehicle component 108 as belonging to a specific vehicle 102 (e.g., using the VI field 206). The personal device 104 may also use the advertised packet 200 to identify function, location, and functional attributes of the in-vehicle component 108, e.g., using the FI field 208 and LI field 210). Also, the personal device 104 may use the advertised packet 200 to gather a baseline RSSI for the in-vehicle component 108 (e.g., using the BR field 214). As mentioned above, the DD field 202 may describe what type of data that a listener should expect. For instance, a first value (e.g., zero) in the DD field 202 may represent generic information broadcast while in the dormant/watchdog state 302-A.

An example of an advertised packet 200 for an in-vehicle component 108 in the dormant/watchdog state 302-A may use the format (A) as shown in FIG. 2. An example is illustrated as follows:

DD-[--SMI--]-[--VI--]-[--------FI--------]-[--LI--]-AF-BR-NC
00-F03D-D30F-00000001-4C494748540000000000-64643208-0F-60-03

In this specific example, the FI field 208 is set to "LIGHT"; the Cartesian location 0x646432 in the LI field 210 indicates decimal units of 100, 100, 50, which may be interpreted as a point in the rear, passenger side, mid-way up inside the vehicle 102, and the zone 0x08 has bit 4 set, which in the example indicates a rear passenger in-vehicle component 108. The AF field 212 indicates that the in-vehicle component 108 is a "watchdog" (always on), a "triangulation-node" (can be used to determine the personal device 104 location), a "functional-node" (provide access to one or more vehicle 102 functions, e.g., in this case control of a light), and an "occupant-interaction-node" (physical interaction with the module triggers a request to display an enhanced interface on the personal device 104).

When a watchdog in-vehicle component 108 detects the presence of a personal device 104, the in-vehicle component 108 may issue a request to "dormant" in-vehicle components 108 in the mesh to wake up. How deeply asleep a "dormant" in-vehicle component 108 is may determine what type of action is performed to wake up the in-vehicle components 108. Non-watchdog in-vehicle components 108 in the "dormant" state 302-A may be transitioned to a "low-power" mode in which they stop advertising but they are still able to receive messages. To wake up these in-vehicle components 108, the "watchdog" module broadcasts a slightly different advertisement using the format (A), with the DD field 202 set to a second value (e.g., one), as follows:

DD-[--SMI--]-[--VI--]-[--------FI--------]-[--LI--]-AF-BR-NC
01-F03D-D30F-00000001-4C494748540000000000-64643208-0F-60-03

Other in-vehicle components 108 may enter a deep sleep in which a physical line has to be pulled up or down to transition the in-vehicle component 108 to another state 302. The "watchdog" in-vehicle component 108 may be configured to control the line. This option may be more power efficient but would require extra hardware and wiring, making the architecture less plug-and-play. Another option may be that most non-watchdog in-vehicle components 108 may simply turn off when a key is removed from the vehicle ignition, and turn on when auxiliary power is restored. A drawback to this approach may be that control over whether the in-vehicle components 108 are "dormant" is removed from the "watchdog" in-vehicle component 108.

When an in-vehicle component 108, "watchdog" or not, wakes up, by default it enters the "notify/triangulate" state 302-B. An in-vehicle component 108 in the "notify/triangulation" state 302-B is awake and broadcasting information to every personal device 104 or in-vehicle component 108 that is listening. As mentioned above, this advertised "generic" information allows a personal device 104 to: (i) identify the in-vehicle component 108 as part of the "Smart-Module" framework; (ii) identify the in-vehicle component 108 as belonging to a specific vehicle 102; (iii) determine its function, location, and functional attributes; and (iv) gather baseline RSSI for the in-vehicle component 108. Each in-vehicle component 108 may periodically broadcast its generic information advertisement packet 200 so that new personal devices 104 entering the vehicle 102, or powering on while in the vehicle 102, may be able to detect presence of the in-vehicle components 108. For in-vehicle components 108 in the "notify/triangulate" state 302-B, the DD field 202 may be set to a value (e.g., two) that represents that the broadcast is of "generic" information and that the in-vehicle component 108 is awake.

Using the format (A), an example advertisement packet 200 for a LIGHT module in the "notify/triangulate" state 302-B may be as follows:

DD-[--SMI--]-[--VI--]-[--------FI--------]-[--LI--]AF-BR-NC
02-F03D-D30F-00000001-4C494748540000000000-64643208-0F-60-03

When awake, a functional-node in-vehicle component 108, such as a light control or a seat control, may broadcast, besides its "generic" information, further information indicative of the available functions and controls provided by the in-vehicle component 108. For instance, a number of individual controls of the in-vehicle component 108 is indicated by the NC field 216 in the generic information template (e.g., 03). Thus, in this specific example, the in-vehicle component 108 interface contains three individual parameters available for control.

To provide the details of the parameters available for control, the in-vehicle component 108 may be configured to broadcast advertisement packets 200 in a control interface template format, such as the format (B). The control interface template format may define the specifics of the interface to the parameters available for control. Some fields of the control interface template are common with the generic module information template, such as the SMI field 204 and the VI field 206.

The other fields may be used to describe the specific control. For instance, a twenty-byte Label field 218 may specify a label name for the control, a two-byte device identifier (ID) field 220 may specify a numeric identifier unique to the control, a two-byte control type (CT) field 222 may specify a control type identifier (e.g., zero for toggle, one for slider, three for slider with increments, four for rotary, five for list-pulldown, six for list buttons, seven for list radio buttons, etc.), a two-byte current state of the control (ST) field 224 (e.g., such as whether a light is on or off, an intensity level of the light, a current color of the light, etc.). It should again be noted that different lengths, types, orders, constant values, and data elements of advertisement packets 200 may additionally or alternately be used. The advertisement packets 200 may also include an eight-byte extras field 226 that may be used to include customized information.

An example depicting the three advertisement packets 200 describing a light interface module with three controls may use the format (B) as shown in FIG. 2. This interface, for example, describes an ON-OFF toggle, an intensity slider, and a color slider:

DD-[--SMI--]-[--VI--]-[--------FI--------]-ID-CT-ST-[EXTRAS]
03-F03D-D30F-00000001-4F4E2D4F464600000000-00-00-00-00000000
03-F03D-D30F-00000001-494E54454E5349545900-01-01-00-00000000
03-F03D-D30F-00000001-434F4C4F500000000000-02-01-00-00000000

As shown, the first listed control of the light interface is an ON-OFF toggle, the second listed control is an intensity slider, and the third listed control is a color slider.

Figure 4:
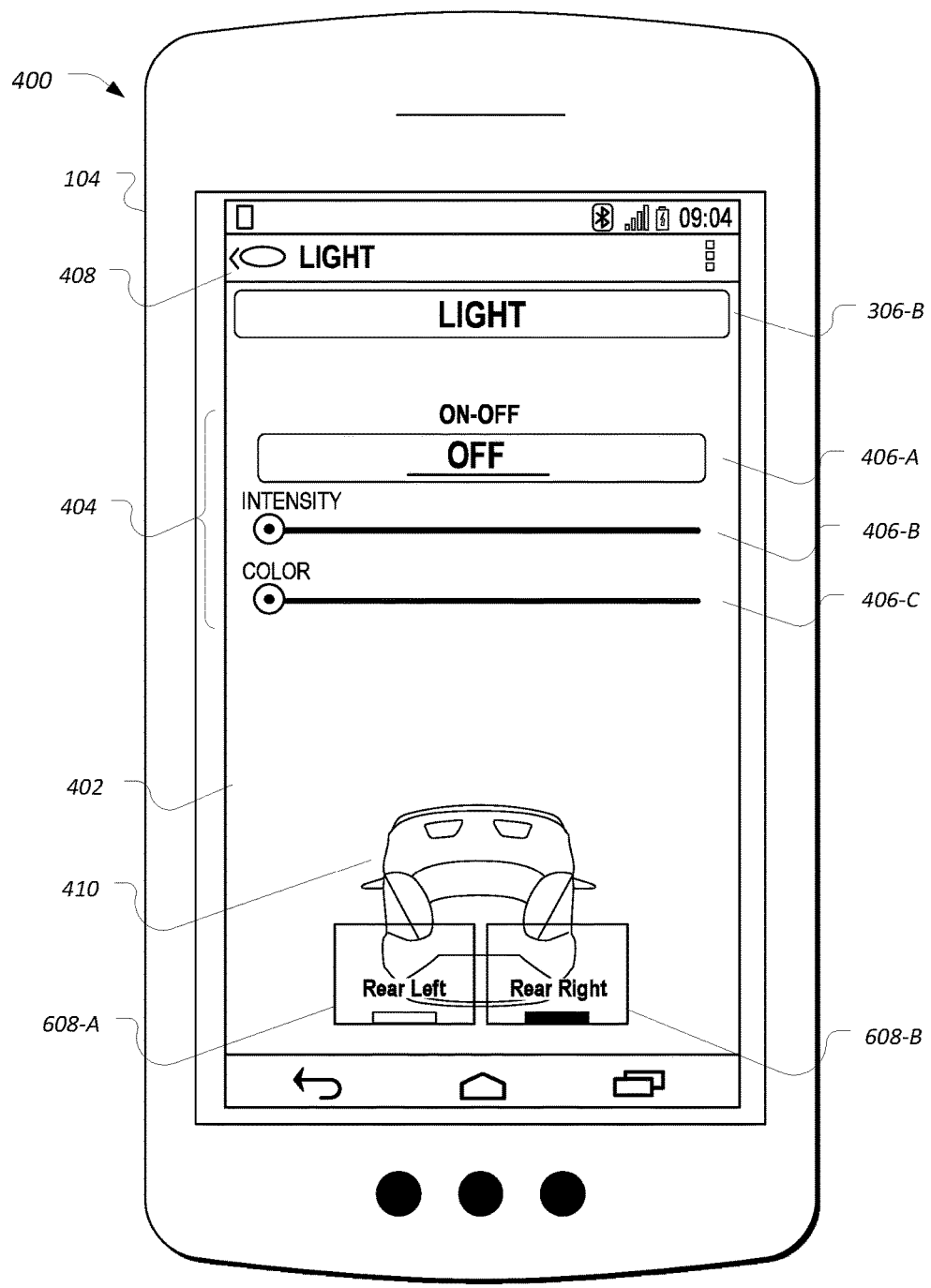
FIG. 4 illustrates an example user interface for control of a lighting in-vehicle component displayed to the personal device based on the advertised control interface template.

FIG. 4 illustrates an example user interface 400 for control of a lighting in-vehicle component 106 displayed to the personal device 104 based on the advertised control interface template. The user interface 400 may be generated by the vehicle component interface application 118 based on the information collected from the advertisement packets 200 of the in-vehicle component 106, and may be provided to a display 402 of the personal device 104.

As shown, the user interface 400 may include a listing 404 configured to display selectable controls 406-A through 406-C (collectively 406) based on the identified in-vehicle components 106 features. Each of the selectable controls 406 may indicate a function of the indicated in-vehicle component 106 that is available for configuration by the user. The user interface 400 may also include a title label 408 to indicate to the user that the user interface 400 is displaying a menu of functions of the indicated in-vehicle component 106.

As illustrated, the listing 404 includes a control 406-A for toggling on and off the light of the in-vehicle component 106 (e.g., generated based on the first control interface template advertisement packet 200 discussed above), a control 406-B for specifying an intensity of the light in-vehicle component 106 (e.g., generated based on the first control interface template advertisement packet 200 discussed above), and a control 406-C for specifying a color of the light of the in-vehicle component 106 (e.g., generated based on the first control interface template advertisement packet 200 discussed above). The listing 404 may also provide for scrolling in cases where there are more controls 406 that may be visually represented in the display 402 at one time. In some cases, the control 406 may be displayed on a touch screen such that the user may be able to touch the controls 406 to make adjustments to the functions of the in-vehicle component 106. As another example, the user interface 400 may support voice commands. For example, to toggle the light on, the user may speak the voice command "LIGHT ON," or simply "ON." It should be noted that the illustrated controls 406 are merely examples, and more or different functions or layouts of functions of the in-vehicle component 106 may be utilized.

In some examples, the user interface 400 may further include a zone interface 410 to select additional in-vehicle components 106 that are available inside the vehicle 102 within different zones 108. As one possibility, the zone interface 410 may include a control 412-A for selection of a driver-side rear zone 108-C, and a control 412-B for selection of a passenger-side rear zone 108-D (collectively controls 608). Responsive to selection of one of the controls 412, the user interface 400 may accordingly display the controls 406 of corresponding in-vehicle component 106 for the selected zone 108. For instance, if the light controls in the zone 108-C are currently being displayed and the user selects the control 412-B to display the corresponding control for the zone 108-D, the user interface 400 may display the functions of the light control for the zone 108-D With reference to FIG. 2, referring back to the extras field 226 of the control interface template that may be used to include customized information, as one example, the range for sliders may be normalized from 0 to 100 to minimize the number of parameters that are exchanged. For a slider with increments (e.g., CT field 222 type of three), the first extras field 226 byte may indicate a step for each increment when the user presses the + and − buttons. As another example, for a rotary control (e.g., with a CT field 222 value of four), the first extra indicates whether it is continuous or mode selector (0x00 for continuous or n for number of detents). The second and third extras indicate the start and end of motion.

For lists (e.g., CT field 222 types five, six, or seven), the first extra indicates the number of choices. For instance, a control interface template advertisement packet 200 for an alphabet list may be as follows:

DD-[--SMI--]-[--VI--]-[--------FI--------]-ID-CT-ST-[EXTRAS]
03-F03D-D30F-00000001-414C5048414245540000-00-05-00-0200000

The list of labels may further be sent in additional advertisement packets 200 using the format (C) as shown in FIG. 2. In an example, the items for the list ID #02 may be as follows:

DD-[--SMI--]-[--VI--]-[--------FI--------]-ID-##
04-F03D-D30F-00000001-4142430000000000000-02-00
04-F03D-D30F-00000001-4445460000000000000-02-01

In the example, the first item of the list may be the letters ABC, while the second item of the list may be the letters DEF. The number (Num) field 228 may include an indication of the number of the item in the list. In the example, all of the bytes of the advertisement packets 200 are not required, thus some bytes are unused 230.

Figure 5:
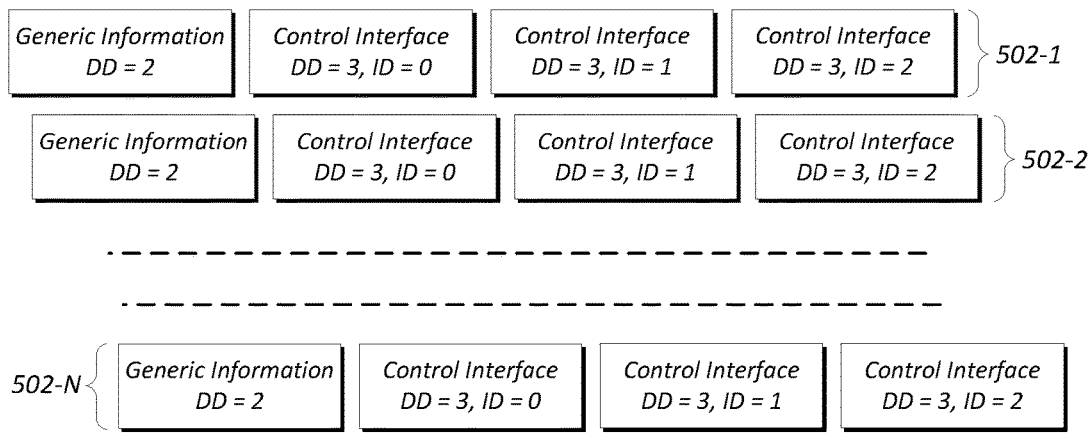
FIG. 5 illustrates an example diagram of packet advertisements for an in-vehicle component while in the "notify/triangulate" state.

FIG. 5 illustrates an example diagram 500 of packet advertisements 200 for an in-vehicle component 106 while in the "notify/triangulate" state 302-B. In the "notify/triangulate" state 302-B shown in FIG. 3, the in-vehicle component 106 may be configured to cycle through an advertisement loop in which the generic information template (e.g., the advertising packet 200 of form (A)) and the individual control interface descriptors are broadcast in sequence. As shown, the diagram includes broadcast cycles 502 for a plurality of in-vehicle components 106. Each in-vehicle components 106 as shown is broadcasting an advertisement packet 200 including the generic information, followed by a set of control interface template advertisement packets 200 for the in-vehicle component 106. Once complete, each of the plurality of in-vehicle components 106 may repeat the broadcast of its corresponding cycle 502.

With reference to FIG. 2, because a communication framework based on packet advertisements 200 is inherently unreliable, some of the individual packet advertisements 200 might not be received by a recipient. To address unreceived packet advertisements 200, the recipient device (e.g., personal device 104) may simply wait for the next cycle (as shown in the diagram 500 of FIG. 5).

In some examples, additional information can be requested from the in-vehicle component 106, such as rich graphic content. In another example, the personal device 104 may request that the in-vehicle component 106 re-broadcast a specific set of packet advertisements 200 by issuing a packet advertisement 200 addressed to a functional label. An example of such a packet advertisement, using the format (H) as shown in FIG. 2, may be as follows:

DD-[--SMI--]-[--VI--]-[--------FI--------]-[ID1--IDn--]
05-F03D-D30F-00000001-4F4E2D4F464600000000-01040000000000

As shown, the personal device 104 is broadcasting the packet advertisement 200 to in-vehicle components 106 of family "LIGHT", requesting that the in-vehicle components 106 resend control interface templates associated with the controls numbered #01 and #04. The control numbers #01 and #04, in the example, may be packed into the ID1-IDn field 232 of the packet advertisement 200. It should be noted that, in the format (H), up to seven IDs may be packed into the ID1-IDn field 232 due to the byte length of the ID1-IDn field 232.

As another example, the in-vehicle component 106 may also provide a rich graphical interface beyond the component definition provided by the control interface template advertisement packets 200. The personal device 104 may request one or more families of the in-vehicle component 106 to provide such an interface in a sequence of advertisement packets 200. To request the transmission of the enhanced interface, the personal device 104 broadcasts an advertisement packet 200 in the format (I) as a "send-interface" request:

DD-[--SMI--]-[--VI--]-[--------FI--------]-[ID]
06-F03D-D30F-00000001-4F4E2D4F464600000000-0000

As shown, the personal device 106 is requesting the in-vehicle components 106 of family "LIGHT" to start broadcasting enhanced interface information via advertisement packets 200.

Responsive to receiving and processing the advertisement packet 200 from the personal device 104, the target in-vehicle component 106 may enter the "Send Interface Template" state 302-C. If the label is present, e.g., not equal to all zeros, in-vehicle components 106 matching the "label" functional family may acknowledge and process the request. If no label is present, all in-vehicle components 106 in the vehicle (e.g., as specified by the VI field 206) may respond.

If the ID field 220 is zero, the target in-vehicle components 106 may transmit the entire graphical template as an ordered sequence of advertisement packet 200. If the ID field 220 is non-zero, the target in-vehicle components 106 will only transmit the advertisement packet 200 with matching ID#. This may be useful for filling gaps, given the potentially unreliable nature of BLE advertisement advertising.

The advertisement packets 200 for the enhanced graphics packet format may be in the format (D) shown in FIG. 2. An example is as follows:

DD-[ID]-PF-NV-[MF]-[V1]-[V2]-[V3]-[V4]-[V5]-[V6]-[V7]-[V8]-[V9]
07-0001-01-NN-MMMM-XXYY-XXYY-XXYY-XXYY-XXYY-XXYY-XXYY-XXYY-XXYY

The Protocol-Flag field 234 may be used to indicate in which protocol the data is formatted. In an example, the Protocol-Flag field 234 may be two-bytes. As some possibilities, the Protocol-Flag field 234 may specify formats such as hypertext markup language (HTML), extensible markup language (XML), and JavaScript object notation (JSON). These formats, however, may incur a significant overhead that can introduce delays when implemented with a low bandwidth communication protocol such as BLE. In other examples, a custom format may be used. For instance, when the protocol flag is set to 01, that may indicate a low-footprint vector graphics protocol (LFVGP).

Using the LFVGP, the Protocol-Flag field 234 may be followed by a number of vertices (NV) field 236 specifying the number of vertices fields 240 used to specify the "raster-vector" polygon, a material flag (MF) field 238 to map texture, color and gradient of the surface, and a sequence of up to nine vertices fields 240. If a polygon requires more than nine vertices fields 240 (NV field 236>09), the list of vertices may continue in the next packet with the next increment of the ID field 220, such as shown below:

DD-[ ID]-PF-NV-[MF]-[V1]-[V2]-[V3]-[V4]-[V5]-[V6]-[V7]-[V8]-[V9]
07-0001-01-30-MMMM-XXYY-XXYY-XXYY-XXYY-XXYY-XXYY-XXYY-XXYY-XXYY
DD-[ ID]-PF-[V10--------------------------------------------[V20]

07-0002-01-XXXX-XXXX-XXXX-XXYY-XXYY-
   XXYY-XXYY-XXYY-XXYY-XXYY-XXYY
DD-[ID]-PF-[V21--------------------------------------
   [V30]
07-0003-01-XXXX-XXXX-XXXX-XXYY-XXYY-
   XXYY-XXYY-XXYY-XXYY-XXYY

Notably, the NV field 234 and the MF field 238 may be used to specify additional V fields 240 in the subsequent advertisement packets 200, as the number and material are specified. After transmitting the full sequence of advertisement packets 200, the in-vehicle components 106 may return from the "send interface template 302-C" state 302-C to the "Notify/Triangulate" state 302-B, unless a personal device 104 is still issuing the send interface request.

To control in-vehicle component 106 functions, such as for a Light in-vehicle components 10 (e.g., turning the light on and off, tuning the color or changing the intensity), the personal device 104 may send "instructions" to the in-vehicle components 106, and the in-vehicle components 106 may communicate their internal state to the personal device 104.

The personal device 104 may communicate a request to an in-vehicle component 106 using the format (E) shown in FIG. 2. The request may specify a vehicle identifier (e.g., in the VI field 206), a family label (e.g., in the FI fields 208), and a seating zone 208 (e.g., in the ZF field 242). Note that all requests are broadcast to the entire mesh. This allows controlling multiple in-vehicle components 106 simultaneously: multiple in-vehicle components 106 in different seating zones 108 may be selected simultaneously by setting respective bits in the ZF field 242 (e.g., as shown zone 3 and zone 4 are selected). Three individual control parameters, CTR1 field 244, CTR2 field 244, and CTR3 field 244, can be "set" in a single advertisement packet 200. The first byte in each CT field 244 is the ID of the individual control and the second byte is the desired value the control should be set to:

DD-[--SMI--]-[--VI--]-[--------FI--------]-ZF-[CT1][CT2]
   [CT3]
08-F03D-D30F-00000001-4F4E2D4F464600000000-
   0C-0101-0220-0310

Responsive to receiving the "process command," the in-vehicle component 106 may transition from the "notify/triangulate" state 302-B into the "process commands" state 302-D. The in-vehicle component 106 may reply to the request with its current settings. Note that because each in-vehicle component 106 reports its own state, only one bit in the zone flag (ZF) field 242 is set by the in-vehicle component 106 at a given time. An example process command is as follows:

DD-[--SMI--]-[--VI--]-[--------FI--------]-ZF-[CT1][CT2]
   [CT3]
09-F03D-D30F-00000001-4F4E2D4F464600000000-01-
   0101-0220-0310

After not receiving any "process command" advertisement packets 200 for a predetermined time interval (e.g., thirty seconds), the in-vehicle component 106 may transition back to the "notify/triangulate" state 302-B.

An in-vehicle component 106 may signal it requires authentication before processing any request by setting the most-significant-bit (MSB) of the DD field 202 in any of the advertisement packets 200 that it broadcasts. For example, the DD field 202 for a notify advertisement packet 202 may be set to 0x82 instead of 0x02, or 1000-0010 instead of 0000-0010 in binary notation. How authentication is managed is completely transparent to the personal device 104. The in-vehicle component 106 that has an "Authenticate" attribute set (e.g., in the AF field 212), may listen for "requests" addressed to any in-vehicle component 106 requiring authentication (e.g., having the MSB of the DD field 202 set).

In an example, the personal device 104 may request the LIGHT module in the third seating zone 108-C (ZF field of 0x04 in hex, 00000100 in binary) to turn-on at a specified intensity and color:

DD-[--SMI--]-[--VI--]-[--------FI--------]-ZF-[CT1][CT2]
   [CT3]
08-F03D-D30F-00000001-4F4E2D4F464600000000-04-
   0101-0220-0310

Responsive to authentication in-vehicle component 106 receiving the request from the personal device 104 (packet advertisements 200 are broadcast), the in-vehicle component 106 may re-broadcast the packet advertisement 200, including the RSSI of the signal from the personal device 104 in the RSSI field 246 of the packet advertisement 200, in the format (F) shown in FIG. 2:

DD-DD-[--SMI--]-[--VI--]-[--------FI--------]-ZF-RSSI
   0A-07-F03D-D30F-00000001-
   4F4E2D4F464600000000-04-XX

A DD field 202 of 0x0C indicates the authorization frame, followed by the original DD field 248 and the information from the original packet (e.g., SMI field 204, VI field 206, FI field 208, etc.). As mentioned, the packet advertisement 200 includes the RSSI of the packet as received by the authentication in-vehicle component 202 from the personal device 104.

If the in-vehicle component 106 has the "Occupant-Interaction-Node" attribute set, each time a physical interaction with the in-vehicle component 106 is detected by the in-vehicle component 106, the in-vehicle component 106 transitions to the "occupant interaction" state 302-F and sends a request to the personal device 104 to invoke and display an enhanced interface to the user via the vehicle component interface application 118 of the personal device 104. This request may be processed by a background service running on the personal device 104. In an example, the request from the in-vehicle component 106 is an advertisement packet 200 in the format (E) as shown:

DD-[--SMI--]-[--VI--]-[--------FI--------]-ZF-[CT1][CT2]
   [CT3]
0B-F03D-D30F-00000001-4F4E2D4F464600000000-
   01-0101-0220-0310

Responsive to the user input, the in-vehicle component 106 may also transition to the "Process-Command" state 302-D and wait for further commands from the personal device 104.

Personal devices 104 located inside the vehicle 102 in the seating zone 108 identified by the ZF field 242 may process the request, and display the control interface for the functional elements identified by the label field 218, and with current settings as defined by the CT1, CT2, and CT3 fields 244. The occupant may accordingly be able to interact with the in-vehicle component 106 by using the user interface 400 of the vehicle component interface application 118 shown by personal device 104, an example of which is illustrated in FIG. 4. User input to user interface of the vehicle component interface application 118 may be translated by the vehicle component interface application 118 into process commands to be broadcast to the mesh.

After not receiving any "process command" advertisement packets 200 for a predefined time interval (e.g., thirty seconds, etc.), the in-vehicle component 106 may transition from the "Process-Command" state 302-D back to the "notify/triangulate" state 302-B.

An in-vehicle component 106 with the "Relay-Node" attribute may act as a "switch" for another in-vehicle component 106. This can simplify the location of physical switches inside the vehicle 102 by decoupling the location of the switch and the controlled in-vehicle component 106, without requiring the two in-vehicle components 106 to be connected by a bus or other wiring. A "Relay-Node" in-vehicle component 106 may mirror any request to change a "controlled" parameter to a target in-vehicle component 106. This process may be transparent to the occupant and the personal device 104.

For example, a "Relay-Node" controls a light switch and exposes some of its interface to the occupant by the way of a physical button and two physical rotary dials. As the occupant interacts with the physical switches, the "Relay-Node" may transition into the "relay request" state 302-G. In the "relay request" state 302-G, the replay in-vehicle component 106 "assumes" the role of a personal device 104 and issues a "process command" request packet advertisement 200, such as packet advertisement shown, to the target in-vehicle component 106. After not detecting any "physical" interaction for a predefined time interval (e.g., thirty seconds), the smart "relay" module may transition back to the "notify/triangulate" state 302-B.

Other in-vehicle components 106 and personal devices 104 may determine whether an in-vehicle component 106 can act as a relay-node by checking bit five of the AF field 212 in the packet advertisement 200 sent by the in-vehicle component 106 while in the "notify/triangulate" state 302-B.

The in-vehicle component 106 may be used to store information needed to automatically pair and connect to classic BLUETOOTH and Wi-Fi devices. The availability of this functionality in the in-vehicle component 106 may be signaled by bit seven of the AF field 212, as mentioned above.

The information needed to connect to an auxiliary device, such as a classic BLUETOOTH speaker in-vehicle component 106 or a wireless display in-vehicle component 106, may be sent via advertisement packet 200. The advertisement packet 200 may be sent in a format (G) shown in FIG. 2, an example of which is as follows:

DD-[--SMI--]-[--VI--]-ZF-[-------MAC-------]-[---PIN----]
0C-F03D-D30F-00000001-01-NN-XXXXXXXXXXXX-NN-XXXXXXXXXXXX

This information may be either broadcast in the "notify/triangulate" state 302-B following the sequence describing the individual control interfaces (e.g., in the cycle described above with respect to FIG. 5) if the in-vehicle component 106 is so programmed. As another possibility, the information may be explicitly requested from the personal device 104 as needed, e.g., using the format (J) shown in FIG. 2:

DD-[--SMI--]-[--VI--]-ZF
0D-F03D-D30F-00000001-01

Responsive to the in-vehicle component 106 receiving a request to send automated connectivity information, the in-vehicle component 106 may transition to the "connectivity help request" state 302-H. After not detecting any "physical" interaction for a predefined time interval, the smart "relay" in-vehicle component 106 may transition back to the "notify/triangulate" state 302-B.

In some examples, each in-vehicle component 106 may have different interaction attributes, defined by a flag variable. The in-vehicle component 106 may possess any combination of one or more of the following interaction attributes: a "Movie-Theater-Flag" (01) that indicates the in-vehicle component 106 can be tuned to optimize a "theater" experience as the user watches a movie; a "Sound-Theater-Flag" (02) that indicates the in-vehicle component 106 can be tuned to optimize a "theater" experience as the user listen to music; a "Notification-Flag" (03) that indicates the in-vehicle component 106 can be tuned to provide enhanced notification to the user as they are received by their personal devices; a "Book-Reading-Flag" (04) that indicates the in-vehicle component 106 can tune the ambiance to enhance the experience of reading a book; and "Office-Flag" (05) that indicates the in-vehicle component 106 can be used to optimize the experience of a virtual office inside the vehicle 102.

For each interaction, a pre-defined setting could be stored in the in-vehicle component 106. The personal device 104 may broadcast a packet advertisement 200 to all in-vehicle components 106 in the vehicle 102 interior, or specifying the seating zone 108 of the personal device 10. The packet advertisement 200 may specify a request to "activate" the settings for a specific activity as it is launched on the device. An example packet advertisement 200 to do so, in the format (K), is shown below

DD-[--SMI--]-[--VI--]-ZF-AC
0E-F03D-D30F-00000001-01-01

Figure 6:
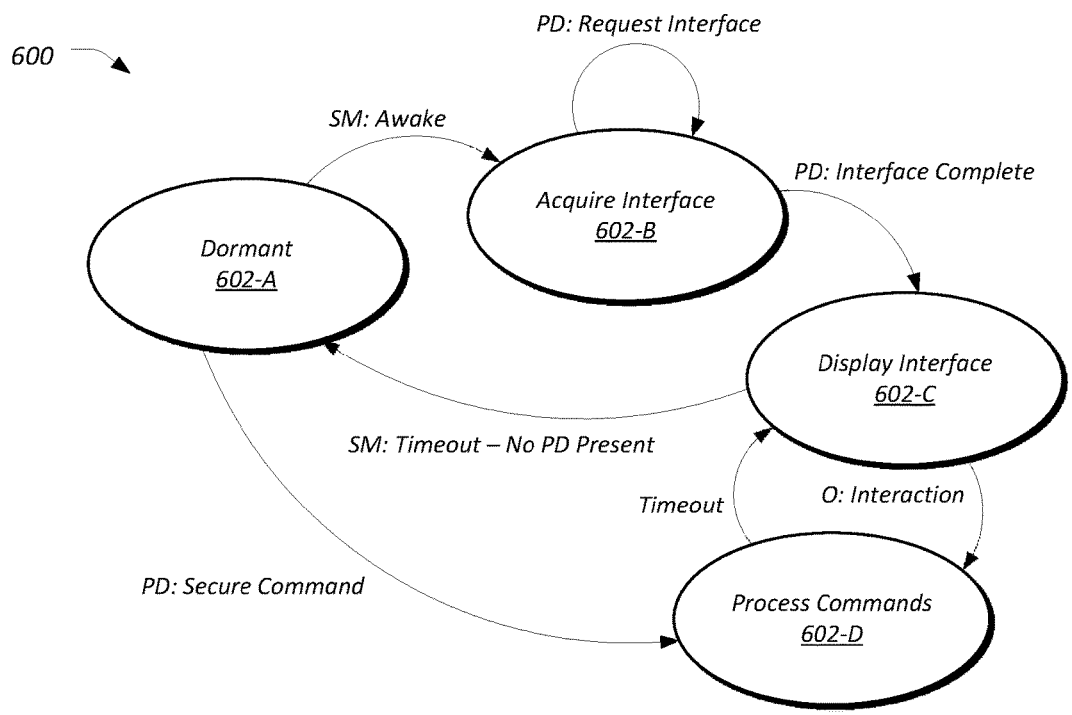
FIG. 6 illustrates an example description of a state machine for use by a personal device.

FIG. 6 illustrates an example description of a state machine 600 for use by a personal device 104. The state machine 600 includes a plurality of states 602 in which the personal device 104 may be set. As with the state machine 300, events or actions for the state machine 600 causing a transition across states 602 are preceded by a short label indicating whether the transition is initiated by the personal device 104 (PD), the in-vehicle component 108 (SM), or by physical action of a vehicle 102 occupant (O). The illustrated possible states (collectively 602) may include a "dormant" state 602-A, an "acquire interface" state 602-B, a "display interface" state 302-C, and a "process commands" state 602-D. It should be noted that the illustrated states 302 are merely an example, and more, fewer, and/or different states 302 may be used.

In the "dormant" state 602-A, the personal device 104 may await packet advertisements 200 from in-vehicle components 106. If packet advertisements 200 are detected, the personal device 104 may transition into the "acquire interface" state 602-B.

In the "acquire interface" state 602-B, the personal device 104 may listen for packet advertisements 200 including the control interface. In an example, the personal device 104 may listen for the cycles 502 of packet advertisements 200 for in-vehicle components 106 in the "notify/triangulate" state 302-B as discussed above. In another example, the personal device 104 may send packet advertisements 200 to request an in-vehicle component 106 to re-broadcast a specific set of packet advertisements 200. In yet a further example, the personal device 104 may request one or more families of the in-vehicle component 106 to provide an enhanced interface in a sequence of advertisement packets 200. Responsive to completion of receipt of the control interface, the personal device 104 may transition to the "display interface" state 302-C.

In the "display interface" state 302-C, the personal device 104 displays a user interface for control of the in-vehicle components 106. An example user interface 400 for LIGHT components is discussed above with respect to FIG. 4. Responsive to user interaction with the user interface 400 to request a change in feature settings, the personal device 104 may transition to the "process commands" state 602-D.

Responsive to a lack of activity for a predetermined time period, the personal device 104 may transition to the "dormant" state 602-A.

In the "process commands" state 602-D, the personal device 104 may send "instructions" to the in-vehicle components 106. Responsive to sending the command, the personal device 104 may transition back to the "display interface" state 302-C.

Figure 7:
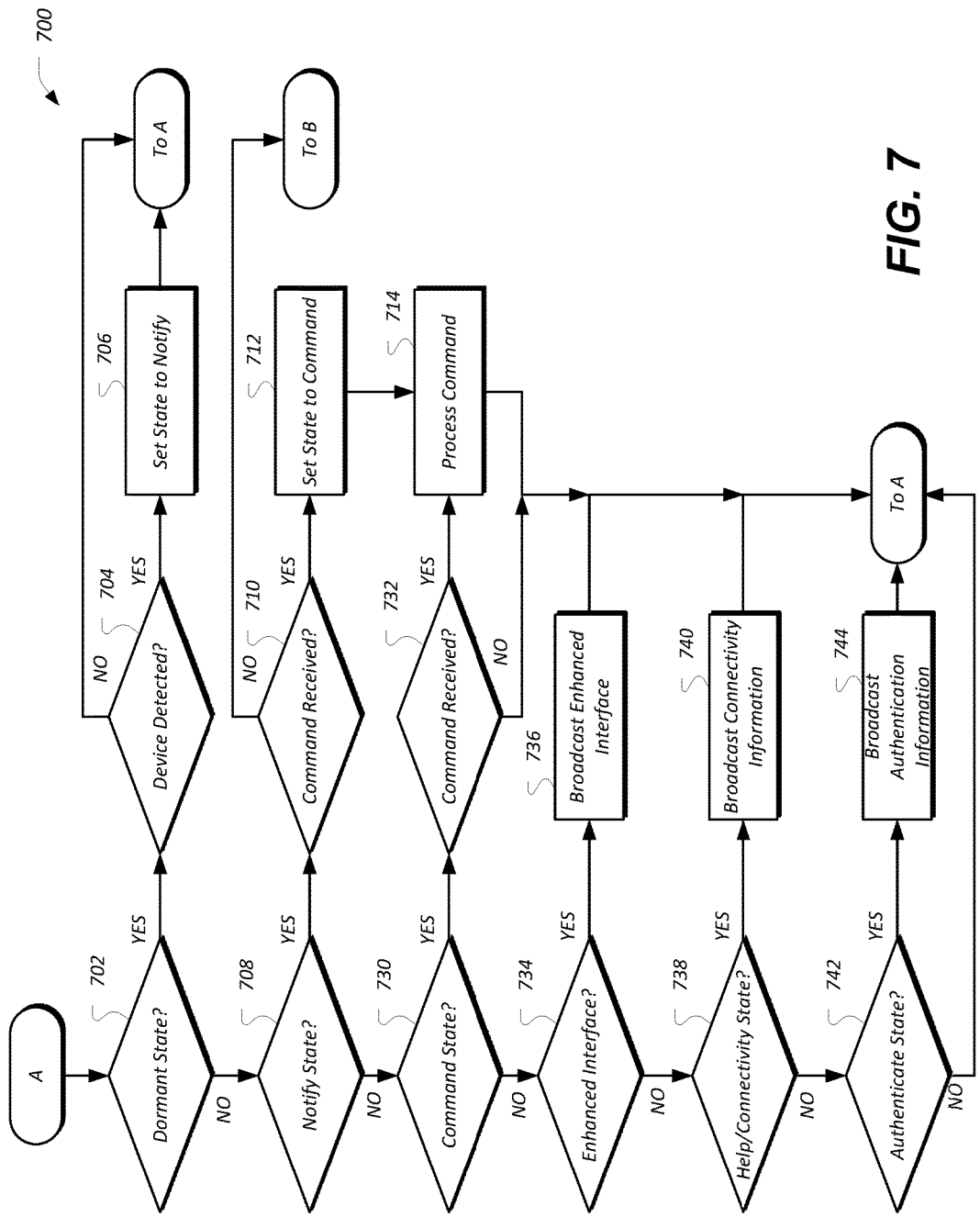
FIG. 7 illustrates an example process for the operation of an in-vehicle component utilizing non-connectable packet advertisement communication.
Figure 7:
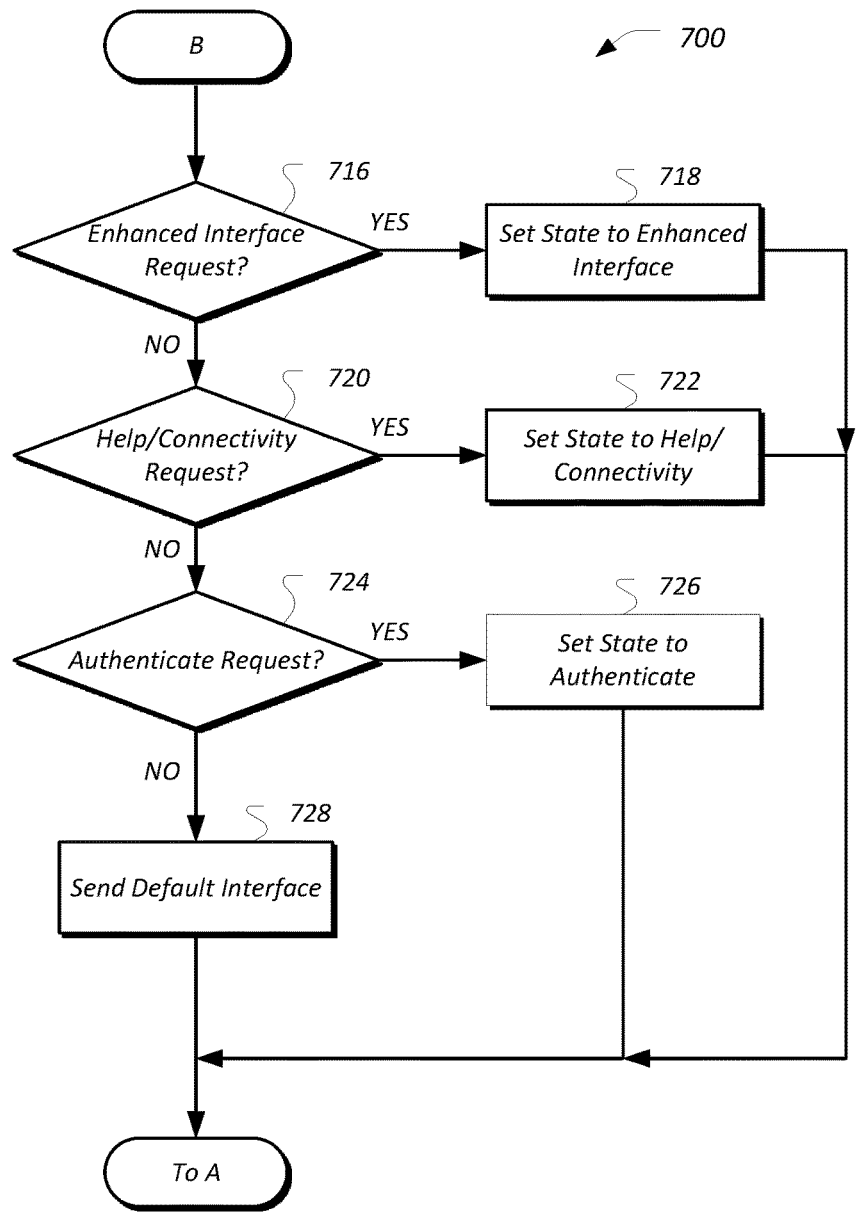

FIG. 7 illustrates an example process 700 for the operation of an in-vehicle component 106 utilizing non-connectable packet advertisement 200 communication. In an example, the process 700 may be performed by an in-vehicle component 106 of the mesh, and may initiate at element (A).

At 702, the in-vehicle component 106 determines whether the in-vehicle component 106 is in the "dormant/watchdog" state 302-A. In an example, the in-vehicle component 106 may maintain an indication of the current state 302 of the in-vehicle component 106 in a storage or memory of the in-vehicle component 106. The in-vehicle component 106 may access the information to determine whether the in-vehicle component 106 is in the "dormant/watchdog" state 302-A. If so, control passes to operation 704. Otherwise, control passes to operation 708.

At 704, the in-vehicle component 106 determines whether a personal device 104 was detected. In an example, the personal device 104 may send a packet advertisement 200 requesting baseline RSSI and/or triangulation to allow the personal device 104 to associate with a seating zone 108 of the vehicle 102, which may be received by the in-vehicle component 106. If the personal device 104 is detected, control passes to operation 706, in which the in-vehicle component 106 transitions to the "notify/triangulation" state 302-B. After operation 706 or if no personal device 104 was detected, control passes back to element (A).

At 708, the in-vehicle component 106 determines whether the in-vehicle component 106 is in the "notify/triangulate" state 302-B. The determination may be performed similar to as discussed above with respect to operation 702. If so, control passes to operation 710. Otherwise, control passes to operation 730.

At 710, the in-vehicle component 106 determines whether a command from the device 104 is detected. In an example, the personal device 104 may communicate a request to the in-vehicle component 106 using the format (E), which may be received by the in-vehicle component 106. If so, control passes to operation 712, in which the in-vehicle component 106 transitions to the "process commands" state 602-D. After operation 712, control passes to operation 714 to perform the detected command. After operation 714, control passes back to element (A). If, on the other hand, no command is received at 710, control passes to operation 716.

At 716, the in-vehicle component 106 determines whether an enhanced interface request from the personal device 104 was detected. In an example, the personal device 104 may communicate a request to the in-vehicle component 106 using the format (I), which may be received by the in-vehicle component 106. If so, control passes to operation 718, in which the in-vehicle component 106 transitions to the "Send Interface Template" state 302-C. After operation 718 or if no enhanced interface request was detected, control passes back to element (A).

At 720, the in-vehicle component 106 determines whether a help/connectivity request was detected. In an example, the personal device 104 may receive a request to the in-vehicle component 106 using the format (G), which may be received by the in-vehicle component 106. If so, control passes to operation 722, in which the in-vehicle component 106 transitions to the "connectivity help request" state 302-H. After operation 722 or if no help/connectivity request was detected, control passes back to element (A).

At 724, the in-vehicle component 106 determines whether an authentication request was detected. In an example, a personal device 104 may request a command from an in-vehicle component 106 that requires authentication. Responsive to the request, the in-vehicle component 106 may re-broadcast the packet advertisement 200, including the RSSI of the signal from the personal device 104 in the RSSI field 246 of the packet advertisement 200, in the format (F). The authentication in-vehicle component 106 may receive the request. If so, control passes to operation 726, in which the in-vehicle component 106 transitions to "authentication" state 302-E. After operation 726, control passes back to element (A). If no authentication request was detected at 724, control passes to operation 728, in which a next cycle 502 of packet advertisements 200 for the in-vehicle component 106 may be broadcast. After operation 728, control passes back to element (A).

At 730, the in-vehicle component 106 determines whether the in-vehicle component 106 is in the "process command" state 302-D. The determination may be performed similar to as discussed above with respect to operation 702. If so, control passes to operation 732. Otherwise, control passes to operation 734.

At 732, the in-vehicle component 106 determines whether a command from the device 104 is detected. In an example, the personal device 104 may communicate a request to the in-vehicle component 106 using the format (E), which may be received by the in-vehicle component 106. If so, control passes to operation 714. After operation 714 or if no command was detected, control passes back to element (A).

At 734, the in-vehicle component 106 determines whether the in-vehicle component 106 is in the "Send Interface Template" state 302-C. The determination may be performed similar to as discussed above with respect to operation 702. If so, control passes to operation 736. Otherwise, control passes to operation 738. At operation 736, the in-vehicle component 106 broadcasts the interface information, such as enhanced graphics packets in the format (D) discussed above. After operation 736, control passes back to element (A).

At 738, the in-vehicle component 106 determines whether the in-vehicle component 106 is in the "connectivity help request" state 302-H. The determination may be performed similar to as discussed above with respect to operation 702. If so, control passes to operation 740. Otherwise, control passes to operation 742. At operation 740, the in-vehicle component 106 broadcasts the connectivity information, such as in the format (G) discussed above. After operation 740, control passes back to element (A).

At 742, the in-vehicle component 106 determines whether the in-vehicle component 106 is in the "authentication" state 302-E. The determination may be performed similar to as discussed above with respect to operation 702. If so, control passes to operation 744. Otherwise, control passes back to element (A). At operation 744, the in-vehicle component 106 broadcasts the authentication information. After operation 742, control passes back to element (A).

Variations on and further aspects of the process 700 are possible. For example, and as discussed above, the process 700 may transition from the "process command" state 302-D to the "notify/triangulate" state 302-B responsive to expiration of a predefined timeout during which no commands were received. As another example, and also as discussed above, the process 700 may transition from the "notify/ triangulate" state 302-B to the "dormant/watchdog" state 302-A responsive to vehicle 102 turnoff or lack of detection of a personal device 104 for a predefined timeout period.

Figure 8:
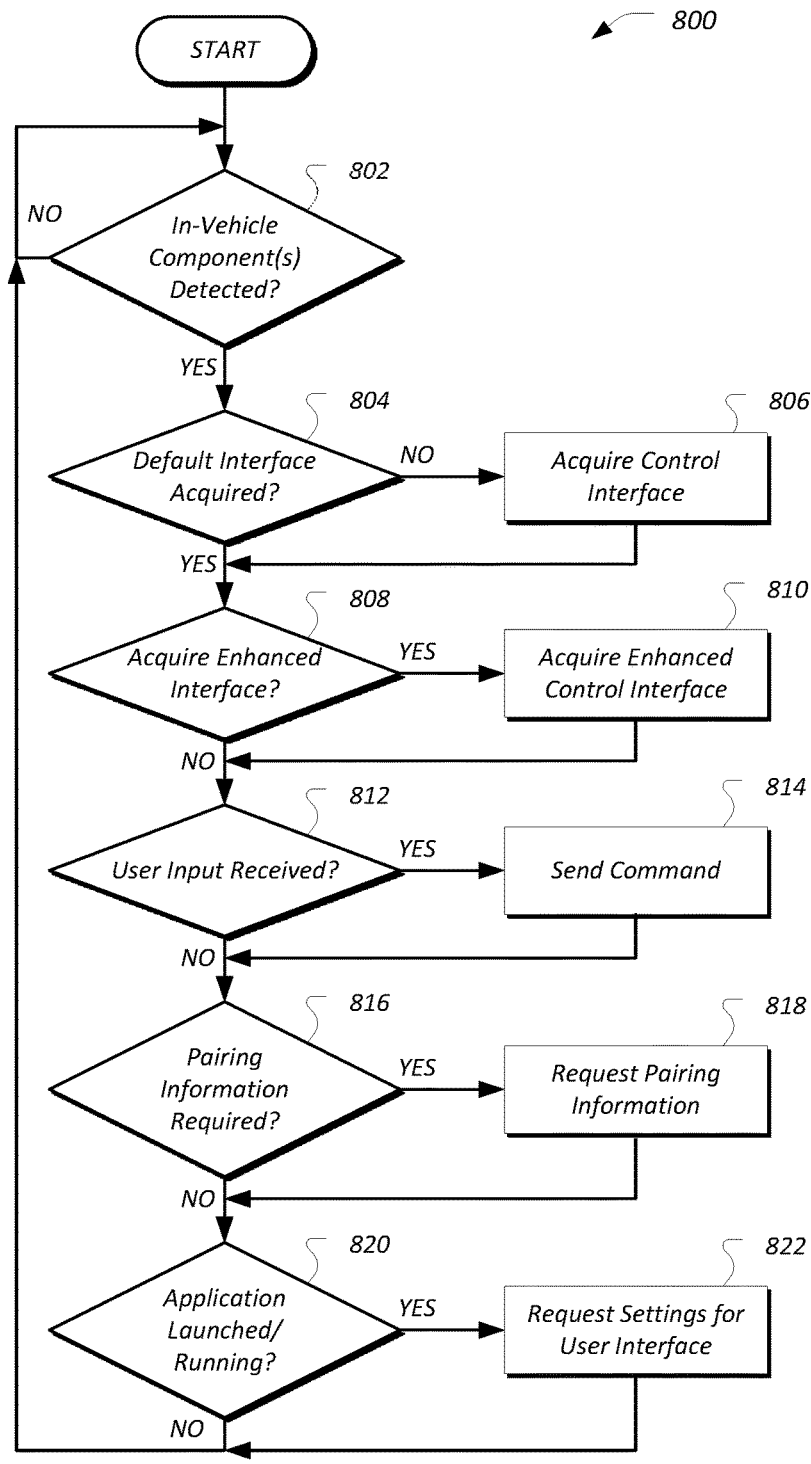
FIG. 8 illustrates an example process for the operation of personal device utilizing non-connectable packet advertisement communication.

FIG. 8 illustrates an example process 700 for the operation of personal device 104 utilizing non-connectable packet advertisement 200 communication. In an example, the process 800 may be performed by a personal device 104 of an occupant configured to communicate with the mesh of in-vehicle components 106.

At 802, the personal device 104 determines whether in-vehicle components 106 are detected. In an example, the personal device 104 may use the wireless transceiver 112 to scan for packet advertisements 200 that include the SMI field 204 value indicative of in-vehicle components 106. If such packet advertisements 200 are identified, control passes to operation 804. Otherwise, the process 800 ends. Or in other examples, the process 800 may return to operation 802 to continue the scanning for packet advertisements 200.

At 804, the personal device 104 determines whether the control interface for the in-vehicle components 106 has been acquired. In an example, the personal device 104 may maintain control interface information for in-vehicle components 106, e.g., in a memory or other storage of the personal device 104. The personal device 104 may query the storage to determine whether control interface information for the in-vehicle components 106 identified by the packet advertisements 200 is previously stored. For instance, the personal device 104 may maintain the control interface information by vehicle identifier (e.g., VI field 206 of the packet advertisement 200) and control identifier (e.g., the ID field of the packet advertisement 200). If the control interface is not stored, control passes to operation 806 to acquire the control interface. Otherwise, control passes to operation 808.

At 806, the personal device 104 acquires the control interface information. In an example, the personal device 104 may listen for the cycles 502 of packet advertisements 200 for in-vehicle components 106 in the "notify/triangulate" state 302-B as discussed above. In another example, the personal device 104 may send packet advertisements 200 to request for an in-vehicle component 106 to re-broadcast a specific set of packet advertisements 200. After operation 806, control passes to operation 808.

At 808, the personal device 104 determines whether to acquire the enhanced control interface for the in-vehicle components 106. In an example, the personal device 104 may determine whether an enhanced interface is previously acquired for the in-vehicle component(s) 106 by accessing the storage. If the enhanced interface is previously acquired control passes to operation 812. Otherwise, control passes to operation 810.

At operation 810, the personal device 104 acquires the enhanced interface. In an example, the personal device 104 may request the transmission of the enhanced interface by broadcasting an advertisement packet 200 in the format (I) as a "send-interface" request, and may receive advertisement packets 200 for the enhanced graphics packet format the format (D). After operation 810, control passes to operation 812.

At 812, the personal device 104 determines whether user input was received. In an example, the user may perform input to the user interface displayed by the vehicle component interface application 118. If so, control passes to operation 814, in which the personal device 104 sends a packet advertisement 200 indicating the command, e.g., using the format (E). After operation 814 or if no command was input, control passes to operation 816.

At 816, the personal device 104 determines whether pairing information is required. In an example, the personal device 104 may determine that BLUETOOTH or Wi-Fi connection information is required to connect to one or more in-vehicle components 106, such as classic BLUETOOTH speaker in-vehicle component 106 or a wireless display in-vehicle component 106. If so, control passes to operation 818, in which the personal device 104 sends a packet advertisement 200 indicating the request, e.g., using the format (G). After operation 818 or if no pairing information was required, control passes to operation 820.

At 820, the personal device 104 determines whether the vehicle component interface application 118 is being launched or is running. In an example, the personal device 104 may determine the vehicle component interface application 118 is started, active as the foreground application, or moving to be the foreground application. If so, control passes to operation 822, in which the personal device 104 requests that the in-vehicle component(s) 106 re-broadcast state by issuing a packet advertisement 200 addressed to the in-vehicle component(s) 106, e.g., using the format (H). This may allow the user interface to display the current state information for the in-vehicle components 106. After operation 822 or if no state information was required, control passes to operation 802.

Thus, the in-vehicle component system 100 may utilize non-connectable packet advertisements 200, such as the various packet advertisements 200 discussed in detail herein, to provide for two-way communication of personal devices 104 to in-vehicle components 106. As compared to advertisements that include information about available services, the non-connectable advertisements may instead be used to broadcast a desired GAP payload indicative of command requests and/or the current state of the in-vehicle components 106. As the personal devices 104 and in-vehicle components 106 do not connect, issues with invisible connected components or BLE module issues may be avoided.

Computing devices described herein, such as the personal devices 104 and in-vehicle components 106, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, Java Script, Perl, etc. In general, a processor (e.g., a microprocessor) receives instructions, (e.g., from a memory, a computer-readable medium, etc.), and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a wireless transceiver; and
a processor, in communication with the transceiver, programmed to:
filter non-connectable advertisements to exclude advertisements lacking a predefined identifier unique to in-vehicle components,
generate a user interface of controls based on information collected from the filtered advertisements, and
broadcast a command advertisement to the in-vehicle components responsive to operator input adjusting a component function using one of the controls.

2. The system of claim 1, wherein each control of the user interface relates to an in-vehicle component function and is defined according to one of a sequence of advertisements received by the transceiver from the in-vehicle components.

3. The system of claim 2, wherein the processor is further programmed to:
broadcast a request for graphical information to the in-vehicle components; and
responsive to the request, receive from the in-vehicle components advertisements including vertex information defining graphics to display in the user interface descriptive of the component functions.

4. The system of claim 1, wherein the non-connectable advertisements include BLUETOOTH Generic Access Profile (GAP) payload information.

5. The system of claim 1, wherein the command advertisement includes a bit field in which each bit of the bit field represents a different seating zone of a vehicle, and the processor is further programmed to encode an indication of which of the seating zones of the vehicle are to be controlled by the command using the bit field.

6. The system of claim 1, wherein each of the filtered advertisements includes a bit field in which each bit of the bit field represents a different seating zone of a vehicle, and the processor is further programmed to generate the user interface of controls accounting for which of the seating zones of the vehicle are to be controlled by the component function.

7. The system of claim 1, wherein each of the advertisements includes a data descriptor field located at a predefined location in the advertisement and defining a type of the advertisement, each type corresponding to a predefined format of data included in the advertisement.

8. The system of claim 7, wherein a predefined bit of the data descriptor field is set to indicate that the corresponding in-vehicle component requires authentication of a sender of the command advertisement before the command advertisement.

9. The system of claim 1, wherein each of the advertisements includes a smart module identifier field including the predefined identifier at a predefined position within the advertisement.

10. A system comprising:
a vehicle component configured to operate in a plurality of connectionless functional states including:
a watchdog state in which the component broadcasts advertisements indicating presence of the vehicle component to personal devices;
a notify state in which the component broadcasts cycles of advertisements indicating available features of the component; and
a process command state in which the component broadcasts current feature state advertisements responsive to command advertisements received from the personal devices.

11. The system of claim 10, wherein the advertisements include a data descriptor field located at a predefined location in the advertisement and defining a type of the advertisement, each type corresponding to a predefined format of data included in the advertisement.

12. The system of claim 10, wherein the command advertisements include a bit field in which each bit of the bit field represents a different seating zone of a vehicle, such that the command advertisements encode indications of which of the seating zones of the vehicle are to be controlled by the command using the bit field.

13. The system of claim 10, wherein the advertisements include an attribute flag configured to indicate which functional states are supported by the vehicle component.

14. The system of claim 10, wherein the vehicle component is programmed to transition from the notify state to the process command state responsive to receiving the command advertisements from the personal devices, and transition from the process command state to the notify state responsive to expiration of a predefined timeout.

15. The system of claim 10, wherein the vehicle component is further configured to operate in a send interface state, and the vehicle component is programmed to transition from the notify state to the send interface state responsive to detection of an advertisement from a personal device requesting interface details of the component, and transition from the send interface state to the notify state responsive to completion of sending the interface details.

16. A system comprising:
a personal device configured to operate in a plurality of connectionless functional states including:
an acquire interface state in which the personal device collects information indicative of component functions based on non-connectable advertisements from in-vehicle components;
a display interface state in which the personal device provides a user interface of controls based on information collected during the acquire interface state; and
a process command state in which the personal device broadcasts command advertisements responsive to operator input to the user interface.

17. The system of claim 16, wherein the personal device is programmed to transition from the acquire interface state to the display interface state responsive to a determination that the information indicative of component functions is collected.

18. The system of claim 16, wherein the personal device is programmed to transition from the display interface state to the process commands state responsive to the operator input to the user interface.

19. The system of claim 16, wherein the personal device is programmed to transition from the process commands state to the display interface state responsive to expiration of a predefined timeout value.

20. The system of claim 16, wherein the personal device is further configured to operate in a dormant state, and personal device is programmed to transition from the dormant state to the acquire interface state responsive to detection of an advertisement from one of the in-vehicle components.

\* \* \* \* \*